United States Patent
Nishiyama et al.

(10) Patent No.: US 6,236,399 B1
(45) Date of Patent: May 22, 2001

(54) DISPLAY METHOD FOR INFORMATION SETTING SCREEN ALONG PROCESS FLOW AND A MULTI-WINDOW TYPE NC APPARATUS HAVING SUCH FUNCTION

(75) Inventors: Kiyotaka Nishiyama, Kanagawa; Takahiro Shibata, Tokyo, both of (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 09/028,997

(22) Filed: Feb. 25, 1998

(30) Foreign Application Priority Data

Feb. 26, 1997 (JP) .................................................. 9-042612

(51) Int. Cl.[7] ..................................................... G06F 5/00
(52) U.S. Cl. ........................... 345/349; 345/348; 345/965
(58) Field of Search ................. 364/474.21, 474.22, 364/474.24; 345/965, 970

(56) References Cited

U.S. PATENT DOCUMENTS

| | | | |
|---|---|---|---|
| 5,122,717 | * 6/1992 | Hayashi | 318/569 |
| 5,378,218 | * 1/1995 | Daimaru et al. | 483/9 |
| 5,391,968 | * 2/1995 | Niwa | 318/569 |
| 5,453,933 | * 9/1995 | Wright et al. | 364/474.23 |
| 5,465,215 | * 11/1995 | Strickland et al. | 364/474.22 |
| 5,576,946 | * 11/1996 | Bender et al. | 364/146 |
| 5,793,635 | * 8/1998 | Niwa | 364/474.34 |
| 5,808,432 | * 9/1998 | Inoue et al. | 318/561 |

* cited by examiner

Primary Examiner—Raymond J. Bayerl
Assistant Examiner—Cao H Nguyen
(74) Attorney, Agent, or Firm—Greenblum & Bernstein, P.L.C.

(57) ABSTRACT

A multi-window type NC apparatus comprises a process flow icon indication instruction portion, an icon corresponding program combination portion, and an icon corresponding program screen instruction portion. Then, this NC apparatus displays an icon group for indicating information setting screens along a process flow, and when any icon is pressed, displays an information setting screen of a program relating to that icon and receives an input.

14 Claims, 21 Drawing Sheets

FIG.20

DISPLAY METHOD FOR INFORMATION SETTING SCREEN ALONG PROCESS FLOW AND A MULTI-WINDOW TYPE NC APPARATUS HAVING SUCH FUNCTION

BACKGROUND OF THE INVENTION

1. Field of the Invention

This invention relates to a display method for information setting screens for displaying a plurality of information setting screens along the flow of the process in a machine tool and a NC apparatus of multi-window type having such function.

2. Description of the Prior Art

Generally, almost all machine tools (bending, punch press, laser, electrical discharge machining, etc.) contain NC apparatus. By operating this NC apparatus, a machining program in which part will be processed how has been determined is produced, and according to this machining program (or called NC program), the machine tool is controlled. Thus, the NC apparatus has a plurality of operation keys of various kinds.

For example, the NC apparatus of a bending machine shown in FIG. 1 has mode key section 3 including a home position mode key 3a, manual mode key 3b, memory mode key 3c, operation mode key 3d, play-back mode key 3e, data input/output mode key 3f and maintenance mode key 3g, function key section 4 containing F1 key, F2 key, . . . and the like.

On a display screen 5, buttons such as shape input software button, bending order input software button, angle input software button, direct input software button and the like are indicated. These buttons correspond to each of the function keys, for example F1 corresponds to shape input software button. Further, the screen is overlaid with a touch panel 6.

When a new product is produced using such NC apparatus, an operator produces products through operation steps which will described below.

When obtaining a new product, the operator first presses the memory mode 3c. According to this memory mode 3c, the NC apparatus 2 displays data list comprising a plurality of processing schedules (including information about NC program, due date, production amount, material, punch, die and the like) preliminarily stored on its screen.

Next, the operator operates the touch panel 6 to select desired items from this data list and then press the F1 to select the shape input software key.

When the shape input software key is selected, the NC apparatus 2 displays workpiece dies information relating to the selected processing schedule, preliminarily stored on the screen.

Next, the operator selects a desired workpiece and dies (die, punch) from the workpiece dies information displayed on the screen.

If a workpiece and dies are selected, the NC apparatus 2 displays an exploded view for determining in what order a product of a selected processing schedule will be processed. This exploded view is preliminarily stored in the memory.

Then, the operator inputs processing order through this exploded view. For example, he determines a process by tracing a line on the exploded view. The NC apparatus 2 produces a program for controlling the bending machine 1 according to a processing order determined on the exploded view.

Next, the operator sets for dies installation. This setting for dies installation is carried out by pressing the home position mode key 3a. If the home position mode key 3a is pressed, the NC apparatus 2 displays a screen for determining a current value of a dies installation metal and the current value inputting through this screen is sent to the ATC for processing.

However, although in such conventional NC apparatus, in what order the keys and buttons must be operated depending on a target product is determined, the keys and buttons provided on the NC apparatus are not arranged along that order.

Thus, an inexperienced operator cannot see in what order the keys and buttons should be operated easily. This is a problem which should be solved about the prior art.

For example, in the conventional NC apparatus for the bending machine, when a new product is obtained, after the memory mode key is selected to input predetermined information, for example, the operator must select a home position mode key located far, not a nearby key or must select any function key (F1 key, F2 key, . . . ).

Even if the operation order of the keys and buttons has been known, the operation screen is changed each time when the key or button is operated.

That is, in the conventional NC apparatus, for setting various kinds of information about a single mode, plural screens are displayed in time series and then such plural kinds of information must be set one by one through each of the screens. Therefore, work efficiency according to the conventional art is very low. This is a problem to be solved by the present invention.

SUMMARY OF THE INVENTION

The present invention has been proposed to solve the above described problem and it therefore is an object of the invention to provide a multi-window type NC apparatus having an indication method and function which enables an inexperienced operator on site to easily see what should be done next through a display screen and input and set almost all information necessary for each mode through a single screen.

To achieve the above object, there is provided an display method for information setting screen along process flow comprising the steps of: indicating a plurality of icons for information setting for each of a plurality of working processes in a machine tool; reading various programs for machining of a product and production image data for the product; combining information setting screen program of a program relating to each icon and production image data, according to a preset combination condition of each icon when the various programs and the production image data are read after the plurality of icons are displayed; and when one of the plurality of icons displayed is selected, displaying a screen of the information setting screen program and a screen of the production image data corresponding to the selected icon, in a region different from a region in which the plurality of icons are displayed.

According to a preferred embodiment of the present invention, display of the plurality of icons is carried out at the same time when the system is started.

Further according to a preferred embodiment thereof, a screen displayed when the system is started includes a plurality of processing schedules containing NC program, due data for products, product quantity, and tool type.

Still further according to a preferred embodiment thereof, the production image data is represented by 3-dimensional diagrams or exploded diagrams.

To achieve the above object from another aspect, there is further provided a multi-window type NC apparatus wherein a plurality of screens are opened on a display portion at the same time and the display portion is overlaid with a touch panel, comprising: a memory storing a plurality of icons for information setting for each of a plurality of working processes in a machine tool in an order of the plurality of working processes; a process flow icon indication instruction portion for reading and indicating the plurality of icons stored in the memory when the system is started; an icon corresponding program combination portion for combining information setting screen program of a program relating to each icon and production image data, according to a preset combination condition of each icon, when the plurality of icons are read; and an indication instruction portion for dispatching an instruction for, when one of the plurality of icons displayed is selected, displaying a screen of the information setting screen program and a screen of the production image data corresponding to the selected icon, in a region different from a region in which the plurality of icons are displayed.

According to a preferred embodiment of the invention, the indication instruction portion dispatches an instruction for indicating a plurality of machining schedules containing NC program, due data for products, product quantity, and tool type, in a region different from a region in which the plurality of icons are displayed.

To achieve the above object from still another aspect, there is further provided a method for determining bending order for bending a workpiece, comprising the steps of: displaying an exploded drawing of a workpiece on a display device; tracing lines to be bent of the exploded drawing with a finger in an order of bending; changing a display color of the traced lines to a predetermined color.

According to a preferred embodiment of the invention, A method for determining bending order for bending a workpiece further comprises the step of displaying numbers of bending order near the traced lines.

To achieve the above object from still another aspect, there is further provided a method for determining disposition of dies comprising the steps of: displaying dies selected for each bending process on a display device; dragging a vertical line which represents machine center horizontally on a screen so as to move all punches and dies in conformity with a movement of the vertical line.

To achieve the above object from still another aspect, there is further provided a method for determining disposition of dies comprising the steps of: displaying dies selected for each bending process on a display device; specifying a punch or die as a target punch or die so as to display a vertical line on the specified punch or die; dragging the vertical line horizontally on a screen so as to move the specified punch or die in conformity with a movement of the vertical line.

The nature, principle and utility of the invention will become more apparent from the following detailed description when read in conjunction with the accompanying drawings.

BRIEF DESCRIPTION OF THE DRAWINGS

In the accompanying drawings:

FIG. 20 is an explanatory view for a screen laser; and

DETAILED DESCRIPTION OF THE PREFERRED EMBODIMENTS

Figure 1:
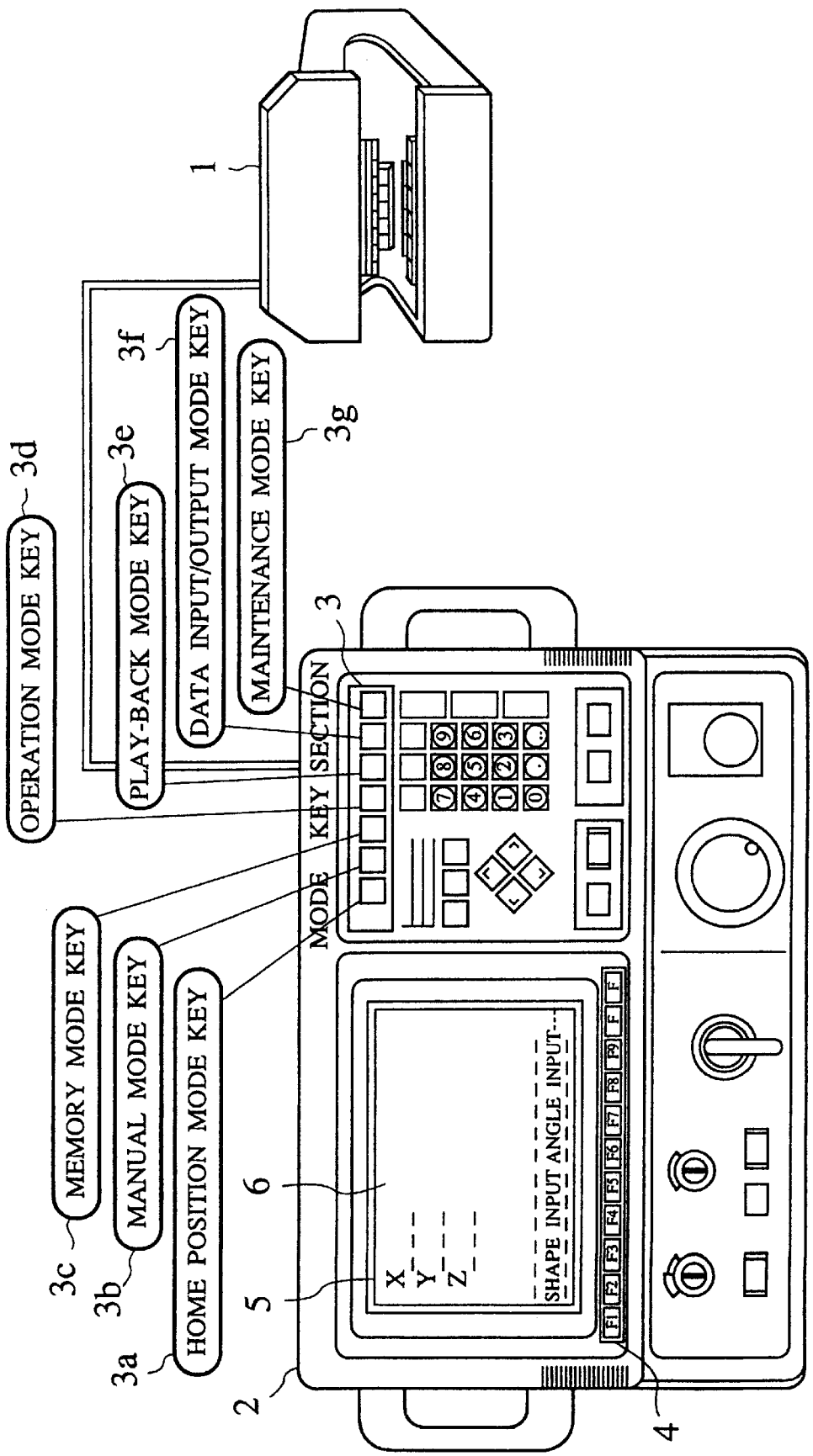
FIG. 1 is an appearance view of a conventional NC apparatus.
Figure 2:
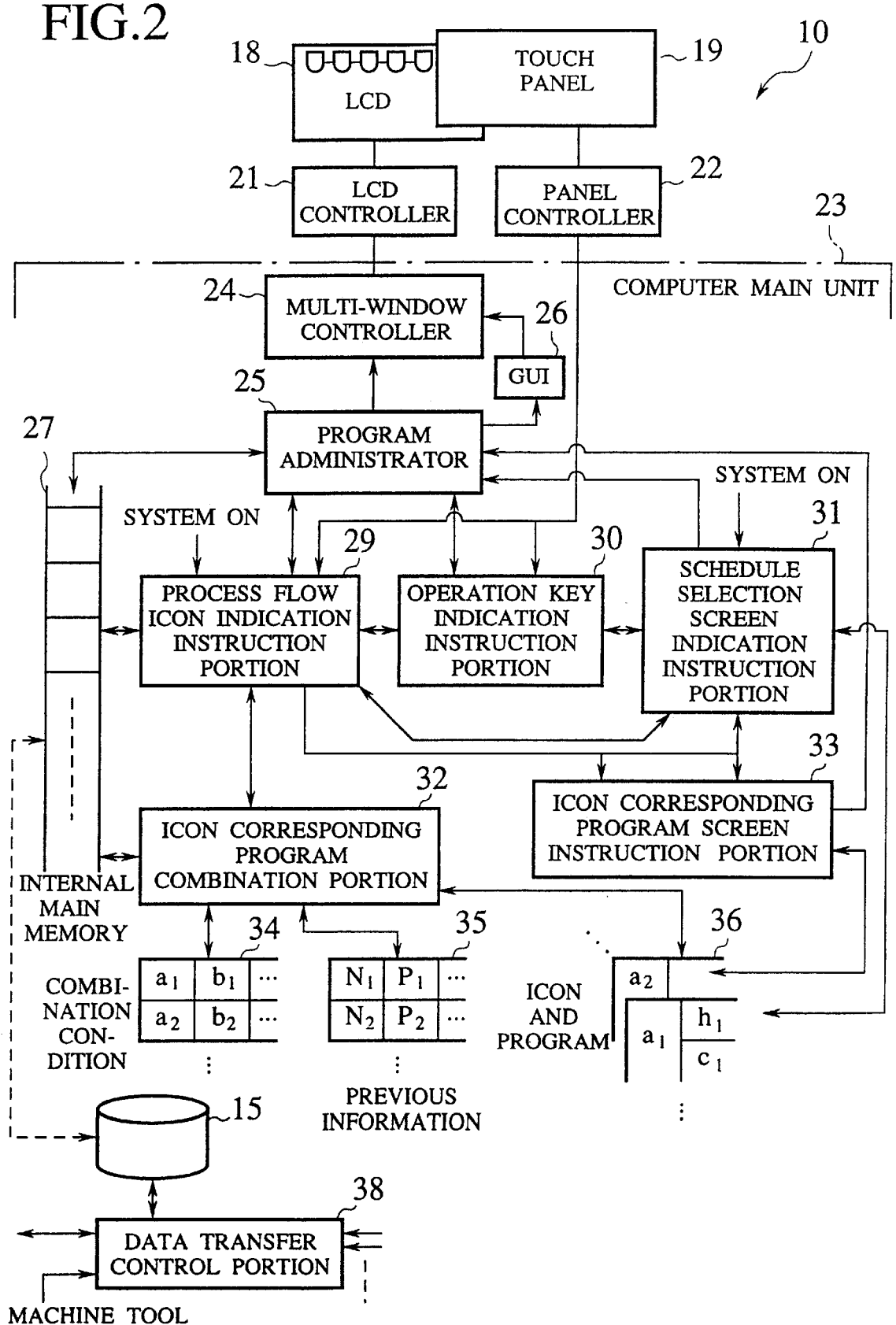
FIG. 2 is a schematic construction diagram of a multi-window type NC apparatus according to an embodiment of the present invention.
Figure 3:
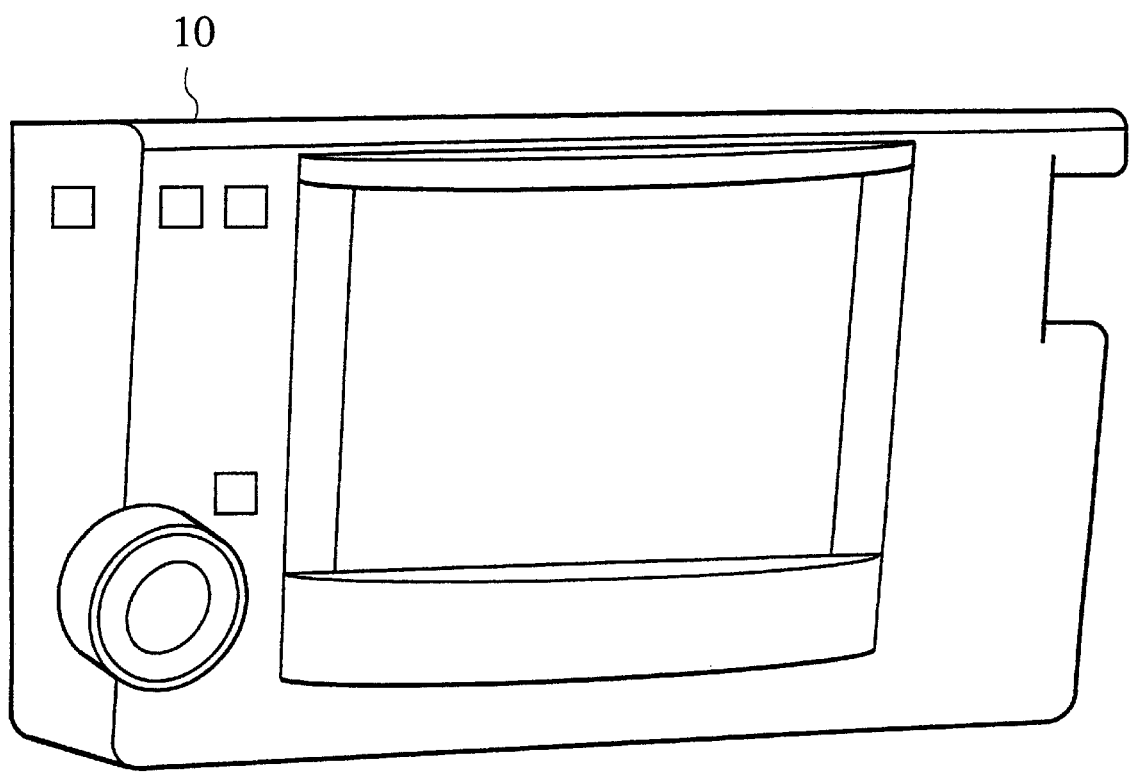
FIG. 3 is an appearance view of the multi-window type NC apparatus according to the present embodiment.

FIG. 2 is a schematic construction diagram of a NC apparatus of multi-window type according to the present invention. FIG. 3 is an appearance view of the NC apparatus of multi-window type of the present invention.

In the NC apparatus 10 of multi-window type shown in FIG. 2, an operator selects each of various information setting screens of respective steps according to the order of operations of machine tool. Through the multi-window displays, the operator is capable of inputting plural kinds of information all at once. Thus, as shown in FIG. 3, this apparatus has no mode key or function key unlike conventional types.

Figure 4:
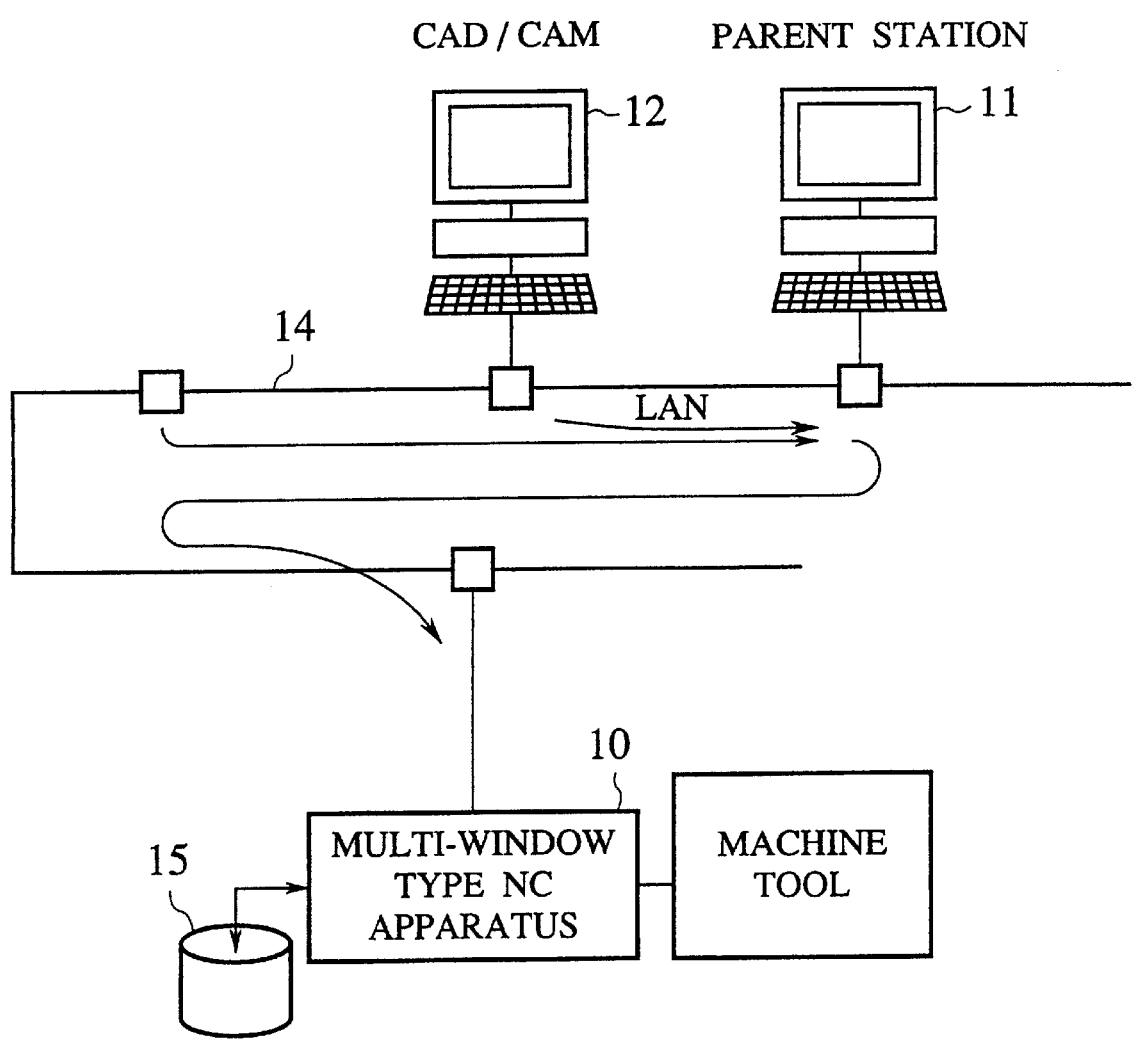
FIG. 4 is a construction diagram of a system in which the multi-window type of the present embodiment is applied.

As shown in FIG. 4, such multi-window type NC apparatus 10 is often connected to a parent station 11, CAD personal computer 12, automatic programming apparatus 13 and other devices through LAN 14.

In this system, the parent station 11 acting as a server transmits CAD data (3-dimensional posture drawings, exploded views) of product corresponding to its machining schedule (information about NC program, due data, production amount, material, punch, die, repeat product and the like) to hard disk 15 of the NC apparatus 10.

In the multi-window type NC apparatus 10, as shown in FIG. 2, a LCD 18 is overlaid with a touch panel 19. This touch panel 19 is controlled by a panel controller 22. This panel controller 22 drives the touch panel 19 and sends position data indicating a pressed position of the touch panel 19 to a computer main unit 23. The LCD 18 is controlled by the LCD controller 21.

The computer main unit 23 comprises a multi-window controller 24 which opens a plurality of screens on the LCD 18 at the same time, a program administrator 25 which fetches various information stored in the disk 15 into an internal main memory 27 and administers the fetched programs so as to display programs in the main memory 27, and a graphic accelerator 26 (hereinafter referred to as GUI) which is started according to an instruction from the program administrator 25.

The computer main unit 23 comprises a process flow icon indication instruction portion 29, operation key indication instruction portion 30, schedule selection screen indication instruction portion 31, icon corresponding program combination portion 32, icon corresponding program screen instruction portion 33, a file 34 in which combination conditions of icon and program are stored, a file 35 for storing program information of previously produced products in each process, a file 36 for storing a predetermined program corresponding to icon produced by the icon corresponding program screen instruction portion 33, and data transfer control portion 38.

Detailed Description of Respective Portions

When the start switch (not shown) is pressed, the schedule ion is selected or process flow icon display is requested, the process flow icon indication instruction portion 29 displays an icon group in which ions indicating various information setting screens of respective steps are arranged in the order of the operations of machine tools (top is schedule icon) on the LCD and turns on the top icon.

Figure 5:
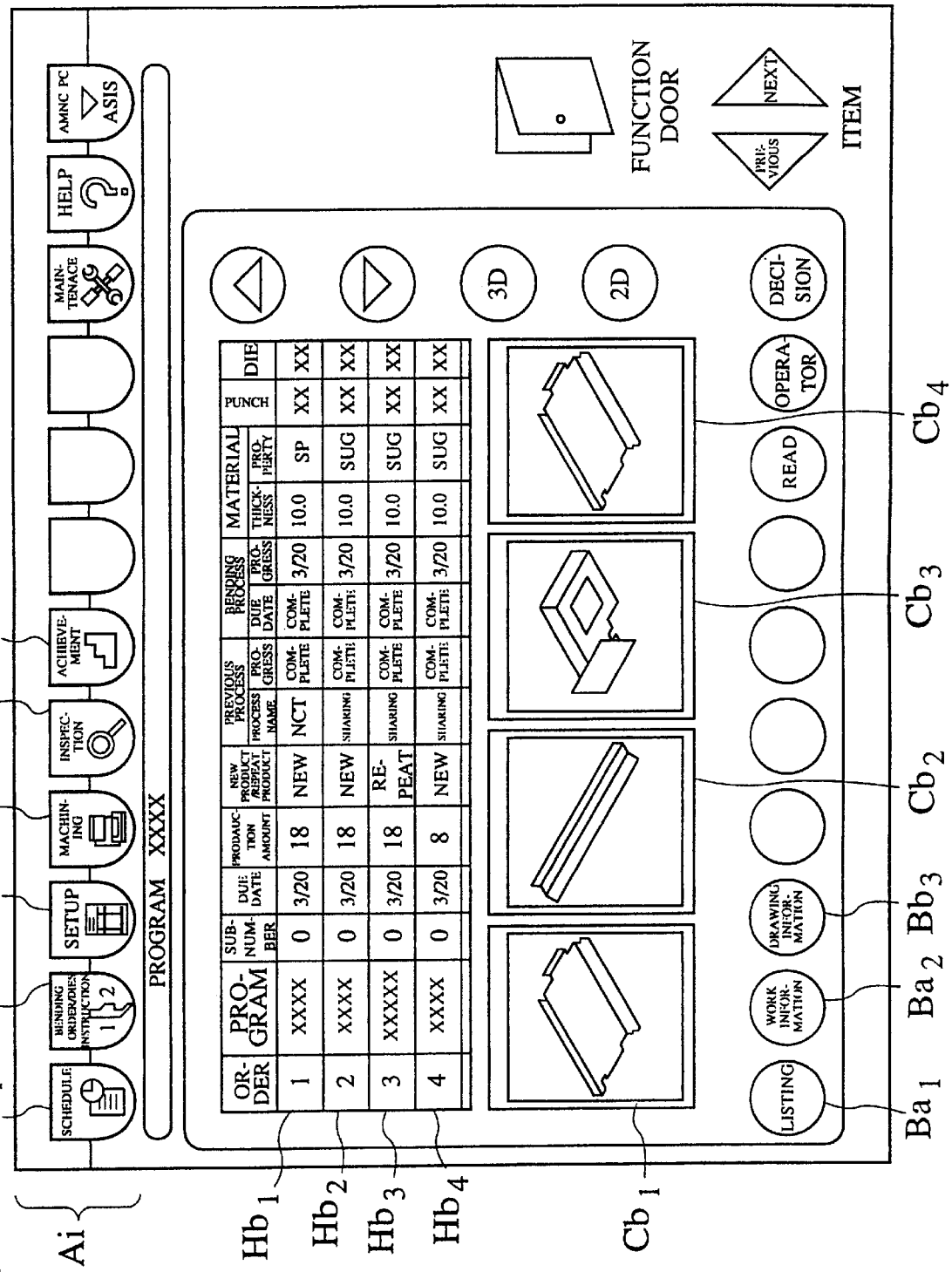
FIG. 5 is an explanatory diagram for a schedule selection screen for bending.

For example, in the NC apparatus for bending machine, icon group Ai shown in FIG. 5 is indicated.

According to the indication of the icon group Ai, the process flow icon indication instruction portion 29 starts the icon corresponding program combination portion 32, schedule selection screen indication instruction portion 31 and icon corresponding program screen instruction portion 33.

When the process flow icon indication instruction portion 29 is notified by the operation key indication instruction portion 30 which will be described later, that an icon has been selected, the name of the selected icon is notified to the icon corresponding program screen instruction portion 33.

Further, when an icon previous key or next key which will be described later is selected by the operation key indication instruction portion 30, an icon forward of or backward of a currently lit icon is turned on and the name of the lit icon (hereinafter referred to as icon parameter ai) is notified to the icon corresponding program screen instruction portion 33.

The operation key indication instruction portion 30 displays button key, function key, item previous key, item next key and the like, and notifies pressing of these keys to the schedule selection screen indication instruction portion 31 and process flow icon indication instruction portion 29.

The button keys include, as for example shown in FIG. 5, list button Ba1, operation information button Ba2, product drawing information button Ba3 and the like.

The schedule selection screen indication instruction portion 31 displays today's machining schedule Hi stored in the main memory 27 and CAD data corresponding to this machining schedule Hi in the form of drawing at the same time.

In FIG. 5, four machining schedules Hb1, Hb2, Hb3, Hb4 are displayed and 3-dimensional posture drawings Cb1, Cb2, Cb3, Cb4 of products based on these machining schedules are displayed.

When started, the icon corresponding program combination portion 32 reads an icon parameter ai in the file 34 storing combination conditions, match the icon parameter ai with all program information Pi (or called information input setting screen program) related to this icon parameter ai according to a combination condition bi of this icon parameter and stores those icon and program in the file 36.

At this time, the icon corresponding program combination portion 32 determines whether a product in NC program of the machining schedule is a new product or repeat product. Then, if it is a new product, the icon corresponding program combination portion 32 stores an icon corresponding program based on the combination condition bi in the file 36 as described above.

If it is the repeat product, a program name pi relating to production order, tool, die and the like of an already determined product (stored in the name of NC program) is fetched out from the file 35 storing previous information and then stored in the file 36 in correspondence to the icon parameter ai.

The icon corresponding program screen instruction portion 33 sets a program information name corresponding to a selected icon parameter ai in the program administrator 25 and displays a program screen of the set program information pi on the LCD.

The data transfer control portion 38 communicates with the parent station and stores machining schedule and CAD data sent from the parent station in the disk 15, and transforms data based on a transfer instruction to its predetermined style and send it to the parent station. Further it stores control information sent from the machine tool main unit in the disk 15.

For bending, the main memory 27 contains information setting screen programs such as bending order instructing image display treatment, dies selective input screen display treatment, dies disposition input screen display treatment, bending simulation display treatment, setup input screen display treatment, trial bending display treatment, inspection screen display treatment, achievement screen input display treatment and the like.

For laser, information setting screen programs such as production condition information input screen display treatment, material/clamp setting screen display treatment and the like are stored.

Further for punching, information setting screen programs such as dies information screen treatment, material/clamp setting screen display treatment, production screen treatment, classification screen treatment and the like are stored.

Further, picture data of respective icons of icon group Ai are also stored in the main memory 27.

Description of Motion

The motion of the NC apparatus of multi-window type having the above described construction will be described below. In this description, it is assumed that the machining schedule Hi and CAD data have been already stored in the disk 15.

Figure 6:
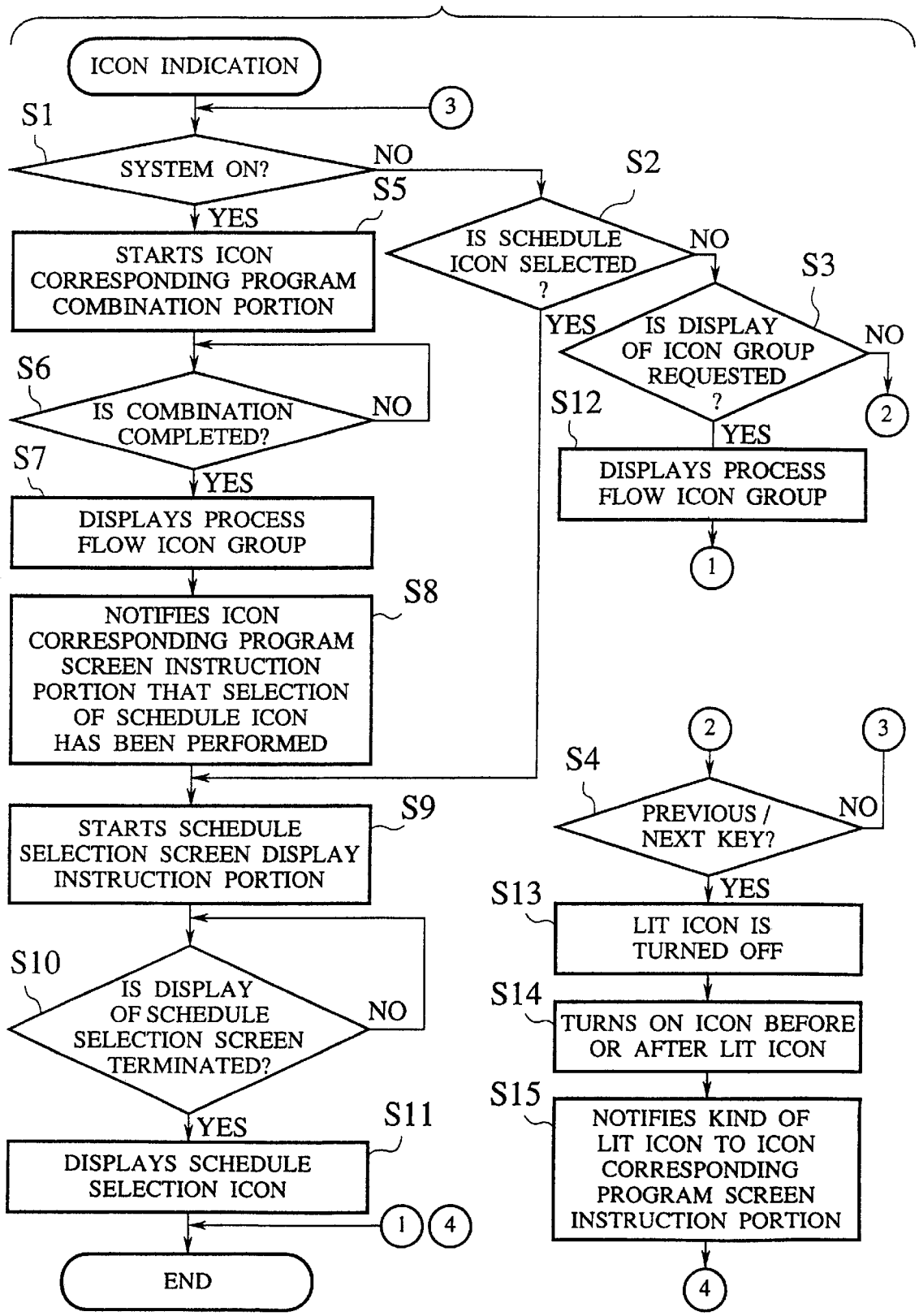
FIG. 6 is a flow chart for explaining icon indication procedure.

First, icon representation will be described with reference to a flow chart shown in FIG. 6. The process flow icon indication instruction portion 29 monitors to check if the system is turned ON, any schedule icon is selected, display of the icon group Ai is requested, and icon previous key/next key has been pressed (S1, S2, S3, S4). Next, if it is determined that the system is turned ON at step S1, the icon corresponding program combination portion 32 is started (S5) so as to determine whether or not production of combination of icon corresponding program information has been completed (S6). The processing of the icon corresponding program combination portion 32 will be described later with reference to drawing.

When it is determined that the combination procedure has been completed at step S5, the process flow icon group Ai is displayed by the program administrator 25 (S7).

If the process flow icon group Ai at step S7 is assumed to be stored in the main memory 27 in the order of schedule icon image, bending order, dies instruction icon image, setup icon image, inspection icon image, . . . for a bending machine, as shown in FIG. 5, schedule icon Aa1, bending order/dies instruction icon Aa2, setup icon Aa3, inspection icon Aa4, . . . are displayed in this order.

Figure 7:
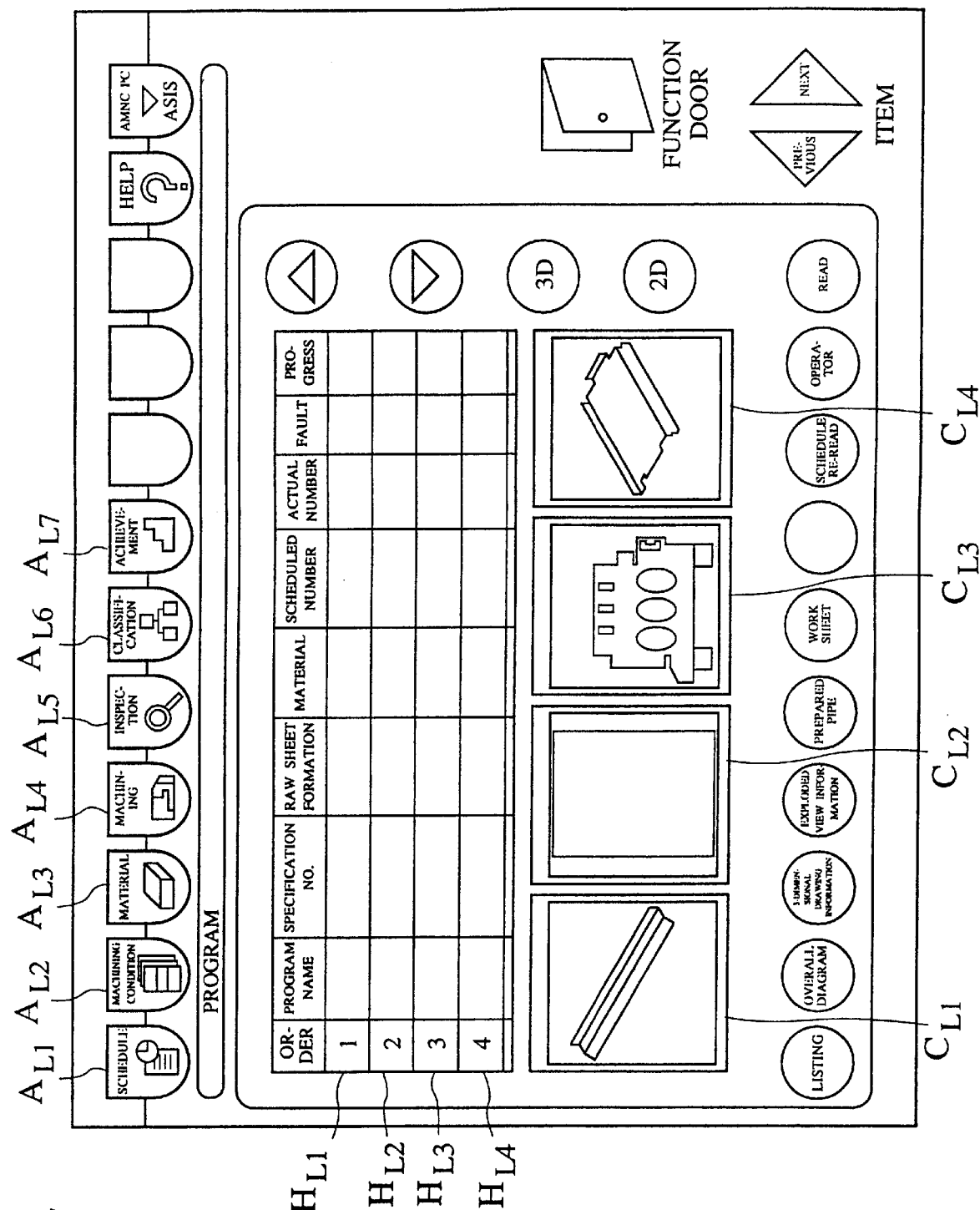
FIG. 7 is an explanatory diagram for the schedule selection screen for laser.

As for layer, if schedule icon image, production condition icon image, material instruction icon image, production icon image, inspection icon image, classification icon image, achievement icon image, . . . are assumed to be stored in the main memory 27 in this order, as shown in FIG. 7, schedule icon AL1, production condition icon AL2, material instruction icon AL3, production icon AL4, inspection icon AL5, classification icon AL6, achievement icon AL7, . . . are displayed in this order.

Figure 8:
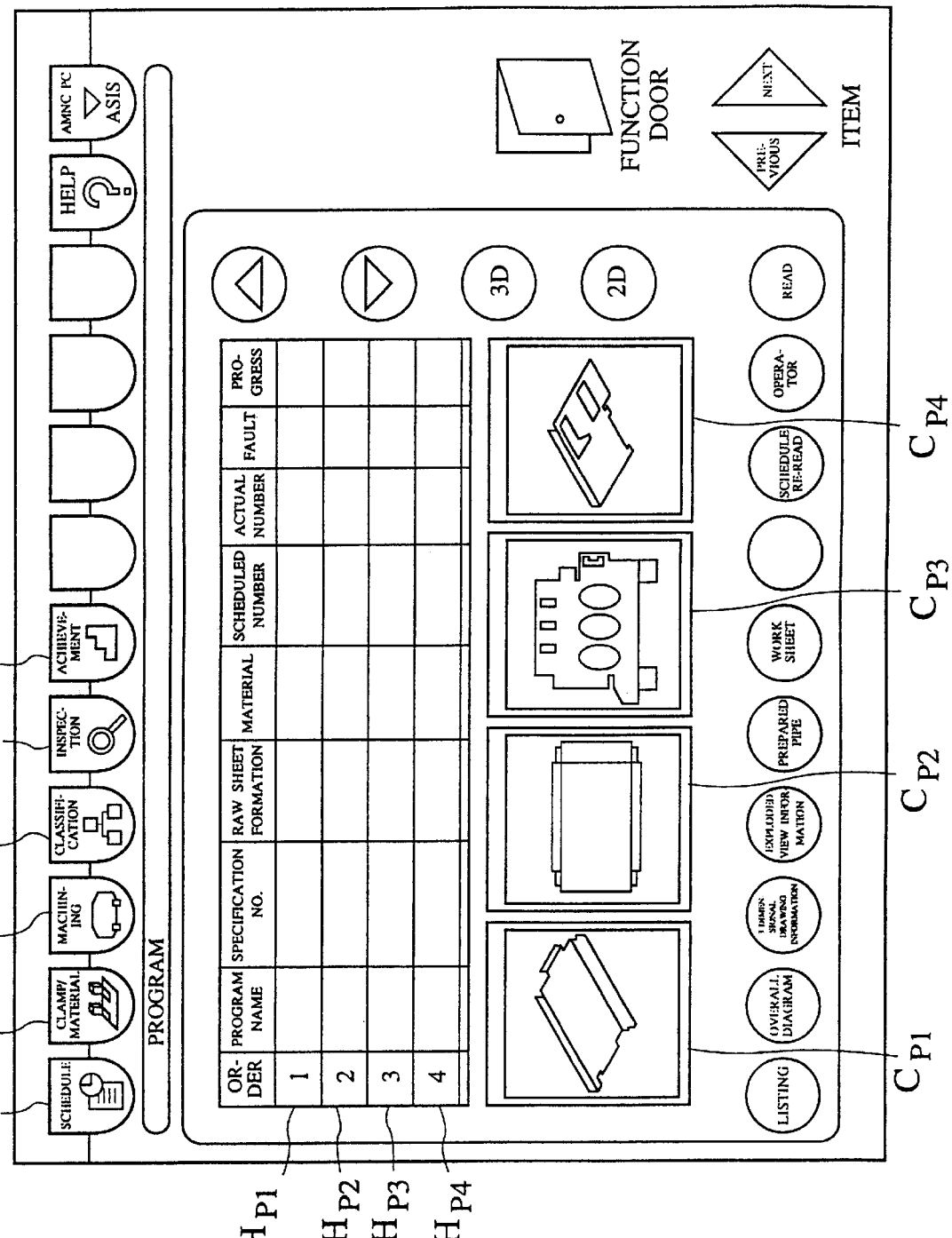
FIG. 8 is an explanatory diagram for the schedule selection screen for punching.

Further, as for punching press, if punching schedule icon image, clamp material icon image, production icon image, classification icon image, inspection icon image, achievement icon image, . . . are stored in the main memory 27 in this order, as shown in FIG. 8, punching schedule icon AP1, clamp material icon AP2, production icon AP3, classification icon AP4, inspection icon AL5, achievement icon AL6, . . . are displayed in this order.

The process flow icon indication instruction portion 29 notifies the icon corresponding program screen instruction portion 33 that selection of schedule ion has been performed (S8) and at the same time actuates the schedule selection screen indication instruction portion 31 (S9).

At step S8, the icon corresponding program screen instruction portion 33 notifies the schedule selection screen indication instruction portion 31 of a storage address in the file 36 for program information pi corresponding to schedule icon Ai.

The schedule selection screen indication instruction portion 31 reads program information pi (plural) of a notified storage address from the file 36 and displays a program screen (information setting screen) of program information by the program administrator 25.

The program screen displayed by the schedule selection screen indication instruction portion 31 includes machining schedule (information about NC program, due data, production amount, material, punch, die, repeat product, etc.) screen and 3-dimensional posture drawing screen (or exploded view) of a product based on each NC program of each machining schedule. The display of the 3-dimensional posture drawing or exploded view is achieved by program administrator 25's sending CAD data stored in the memory 27 to GUI.

For bending machine, the aforementioned 3-dimensional posture drawings include, for example, machining schedules Hb1, Hb2, Hb3, Hb4 and 3-dimensional posture drawings Cb1, Cb2, Cb3, Cb4 of product based on the machining schedules Ha1, Ha2, Ha3, Ha4, as shown in FIG. 5.

As for laser, the 3-dimensional posture drawings include machining schedules HL1, HL2, HL3, HL4 and 3-dimensional posture drawings CL1, CL2, CL3, CL4 or product based on the machining schedules HL1, HL2, HL3, HL4, as shown in FIG. 7.

Further, as for punching, the 3-dimensional posture drawings include machining schedules Hp1, Hp2, Hp3, Hp4 and 3-dimensional posture drawings Cp1, Cp2, Cp3, Cp4 of product based on the machining schedules Hp1, Hp2, Hp3, Hp4, as shown in FIG. 8.

Next, the process flow icon indication instruction portion 29 determines whether or not display of schedule selection screen is terminated (S10) and if the display of schedule selection screen is termination, immediately turns on the schedule ion A1 (S11).

For bending, the schedule icon Ab1 of FIG. 5 is lit, for laser, the schedule icon AL1 of FIG. 7 is lit, and for punching, the schedule icon Ap1 of FIG. 8 is lit.

If the schedule icon A1 is selected at step S2, you go to step S9 in which the schedule selection screen indication instruction portion 31 is actuated to display the schedule Hi and 3-dimensional posture drawing Ci corresponding to the schedule icon A1. At this time, the schedule selection screen indication instruction portion 31 actuates the process flow icon indication instruction portion 29 and operation key indication instruction portion 30, so as to display the icon group Ai, function keys, button keys, previous/next item keys.

That is, for bending, the multi-window screen of the schedule selection shown in FIG. 5 is displayed, for laser, the multi-window screen of the schedule selection shown in FIG. 7 is displayed and for punching, the multi-window screen of the schedule selection shown in FIG. 8 is displayed.

If there is a request for icon group indication from other processing section at step S3, the process flow icon indication instruction portion 29 displays process flow icon Ai (S12) and terminates this processing. That is, in other program screen, the process flow icon Ai can be displayed.

When it is determined that the previous or next key has been pressed at step S4, the currently lit icon is turned off (S13).

Then, an icon before or after the lit icon is turned on (S14) and the kind of an icon lit at step S14 is notified to the icon corresponding program screen instruction portion 33 (S15).

The icon corresponding program screen instruction portion 33 retrieves a program corresponding to the notified icon and then notifies the program administrator 25 of it.

The program administrator 25 starts a program corresponding to the notified program information and displays the screen of that program. The program screen will be described later.

The aforementioned processing from step S13 to step S14 is such that for example, if the next key is pressed when a schedule selection screen for bending machine of FIG. 5 is displayed, the schedule icon Ab1 is turned off and then the bending order/dies instruction icon Aa2 is turned on.

Figure 9:
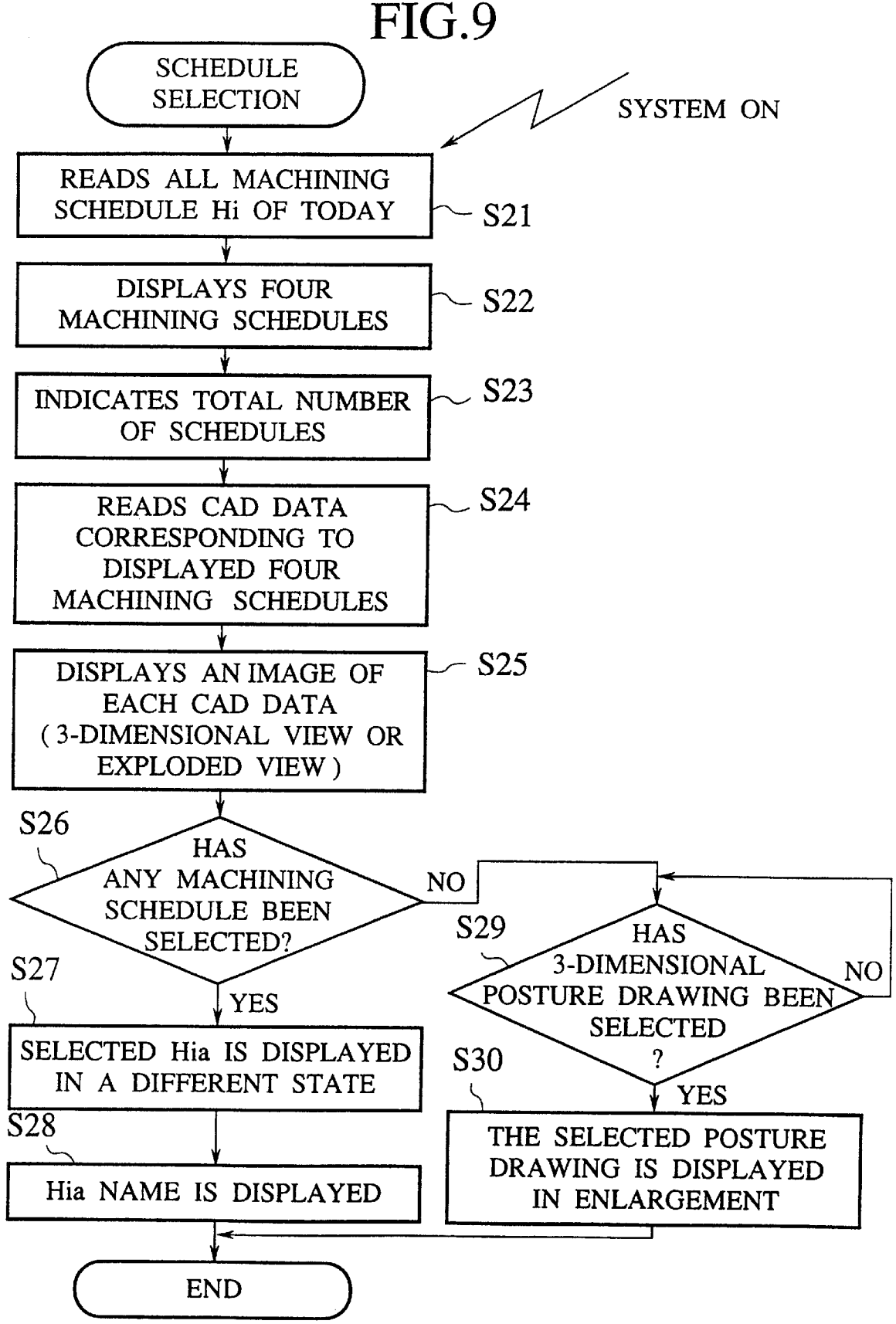
FIG. 9 is a flow chart for explaining schedule selection procedure.

Next, the processing of the schedule selection screen indication instruction portion 31 will be described according to a flow chart of FIG. 9.

When the system is turned ON, the schedule selection screen indication instruction portion 31 makes the program administrator 25 to read all machining schedule Hi for today from the hard disk 15 to the main memory 27 (S21), displays four machining schedules Hi or them on the LCD 18 (S22) and at the same time, indicates a total number of the machining schedule of today (S23). In FIG. 5, the total number of 10 is indicated.

Next, the schedule selection screen indication instruction portion 31 reads CAD data name corresponding to the displayed four machining schedules from the file 36, notifies the CAD data name to the program administrator 25 (S24) and displays the CAD data graphically (S25). The program administrator 25 displays the CAD data corresponding to the CAD data name stored in the main memory 27 on the screen in the form of 3-dimensional drawing by means of the GUI.

For example, for bending, the 3-dimensional posture drawings Cb1, Cb2, Cb3, Cb4 shown in FIG. 5 are displayed. For laser, the 3-dimensional posture drawings CL1, CL2, CL3, CL4 shown in FIG. 7 are displayed. Further, for punching, the 3-dimensional posture drawings Cp1, Cp2, Cp3, Cp4 shown in FIG. 8 are displayed.

After the aforementioned machining schedule Hi and 3-dimensional posture drawing Ci are displayed, the schedule selection screen indication instruction portion 31 determines whether or not any machining schedule has been selected (S26). If it is determined that selection of machining schedule has been carried out at step S26, a selected machining schedule Hia is displayed in a state different from other machining schedules (S27). In FIG. 5, machining schedules Hb3 has been selected.

Then, a program name of the selected machining schedule Hia is displayed and then this processing is terminated.

If it is determined that selection of the machining schedule has not been performed at step S26, it is determined whether or not any 3-dimensional posture drawing has been selected (S29). If it is determined that selection of the 3-dimensional posture drawing has been carried out at step S29, the selected posture drawing is enlarged and displayed (S30) and this processing is terminated.

Figure 10:
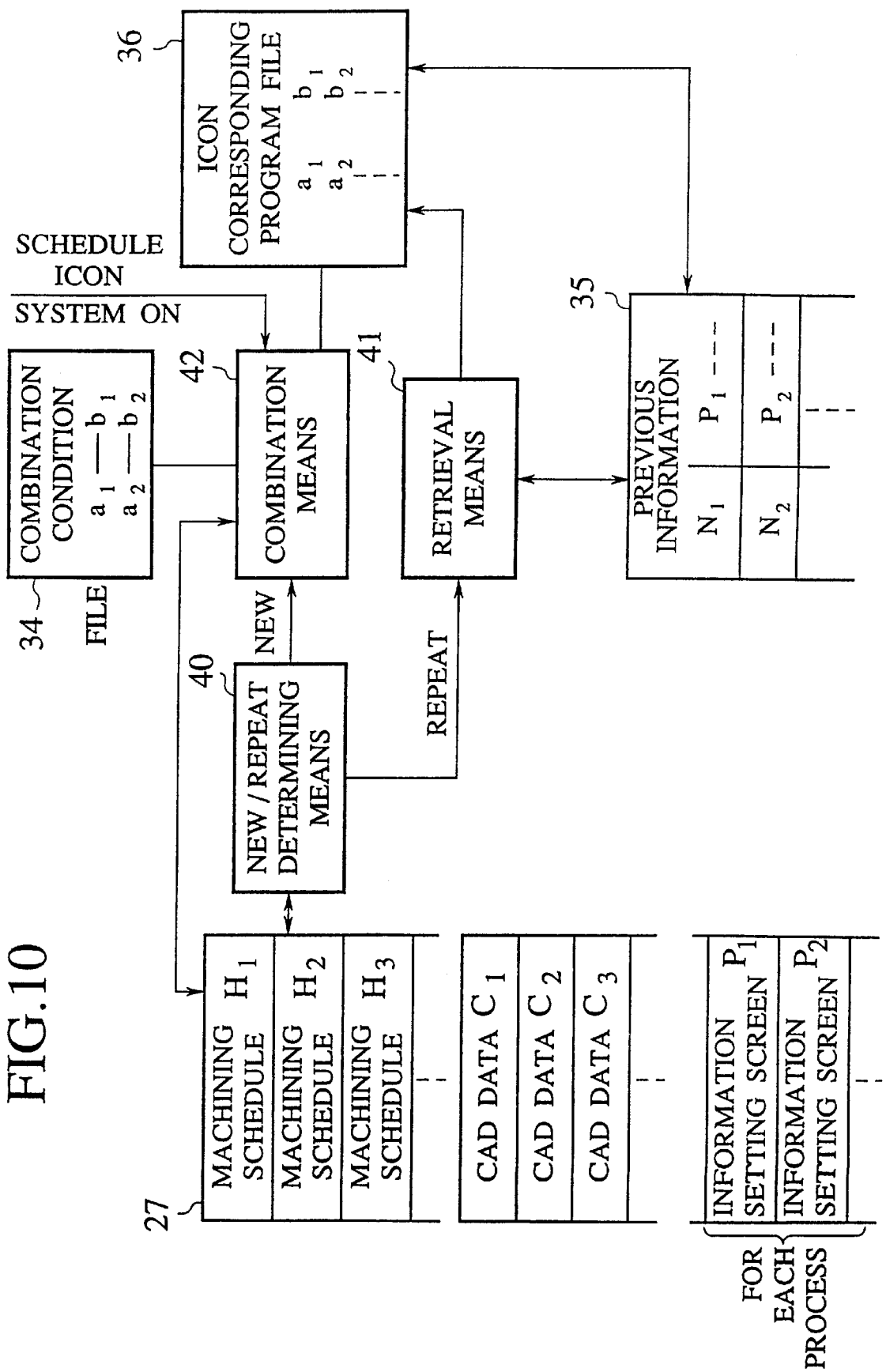
FIG. 10 is a program block diagram of icon corresponding program combination portion.

Next, the processing of the icon corresponding program combination portion 32 will be described with reference to a program block diagram shown in FIG. 10.

The icon corresponding program combination portion 32 contains new/repeat determining means 40, retrieval means 41, and combination means 42.

The new/repeat determining means 40 reads machining schedules Hi (H1, H2, H3, H4, . . . ) in the main memory 27 in order, determines which a product of read machining schedule is new or repeat, and if the product is repeat product, actuates the retrieval means 41 so as to notify its product name (NC program name).

If the product is new, the combination means 42 is started so as to notify the storage address of read machining schedule.

The retrieval means 41, when notified of a name of that repeat product, retrieves program information pi of processing information corresponding to this product from the file 35 and store it with correspondence to icon information ai of the file 36.

For the bending machine, the program information pi of this processing information contains bending order, dies, simulation picture data and the like.

When the system is turned on, the combination means 42 reads machining schedule Hi from the main memory 27, and according to predetermined combination conditions in the file 34, and stores the icon parameter ai and program information pi corresponding to that icon parameter ai with correspondence therebetween.

Further, the combination means 42 reads the machining schedule Hi of a product determined to be new and stores program information (information input screen in step) image in the file 36 with correspondence to the icon parameter ai.

Figure 11:
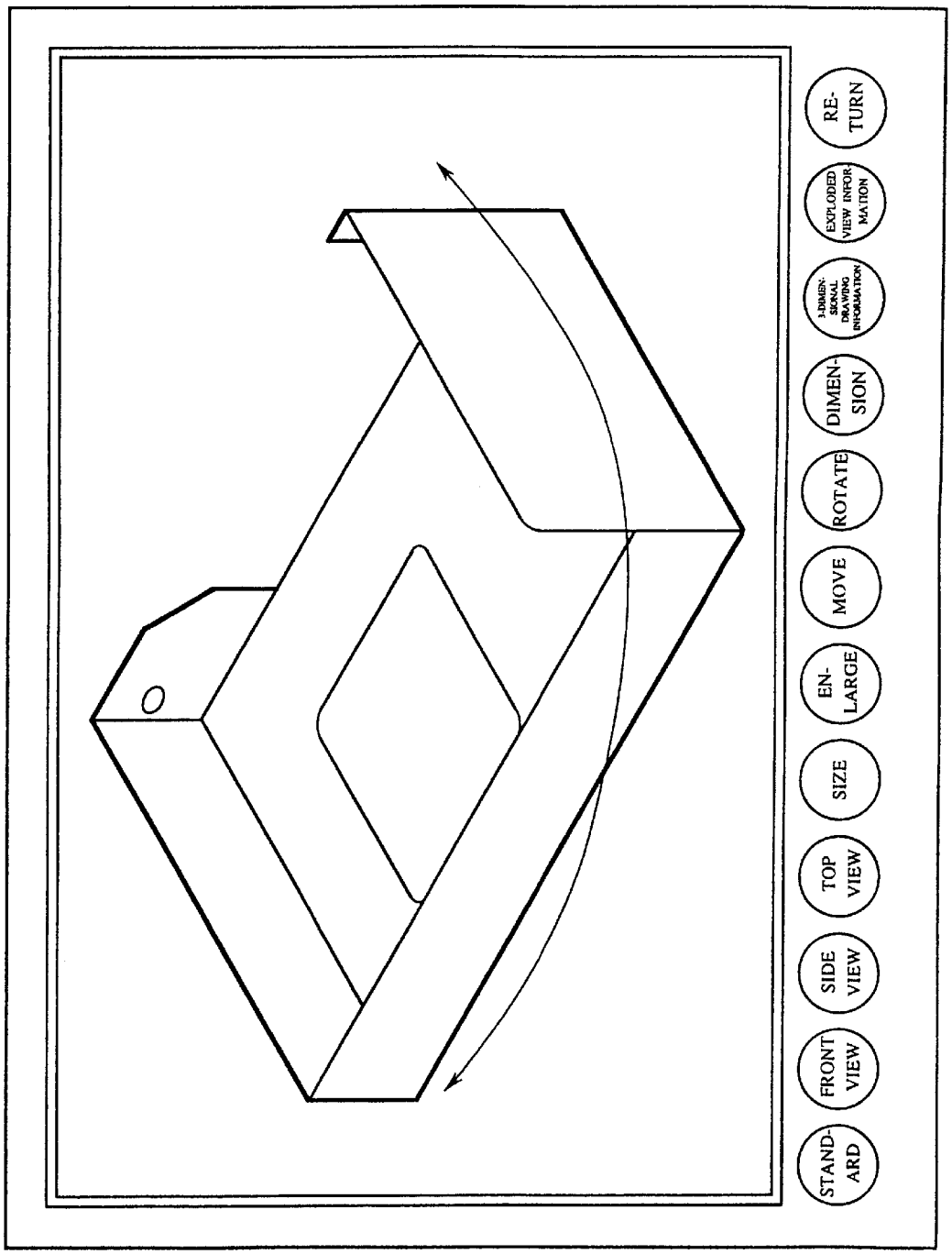
FIG. 11 is an explanatory diagram for the simulation screen on the schedule selection screen.

When a 3-dimensional posture drawing C1 is pressed at step S30 and that drawing is displayed in enlargement, as shown in FIG. 11, the schedule selection screen indication instruction portion 31 automatically rotates it for several minutes so that its overall posture can be seen.

The above described configuration is applied to the NC apparatus for bending machine, laser and punching press. An example of a case when an icon other than the schedule icon A1 is selected will be described below.

NC Apparatus for Bending Machine

For example when the schedule selection screen shown in FIG. 5 is displayed, if the bending order/dies instruction icon Ab2 is pressed manually, the icon corresponding program screen instruction portion 33 finds a program of information setting screen for bending order instruction, which is a program information pi corresponding to this icon and notifies the program administrator 25 of this program.

The program administrator 25 displays a program screen of the program for bending order instruction from the main memory 27.

Figure 12:
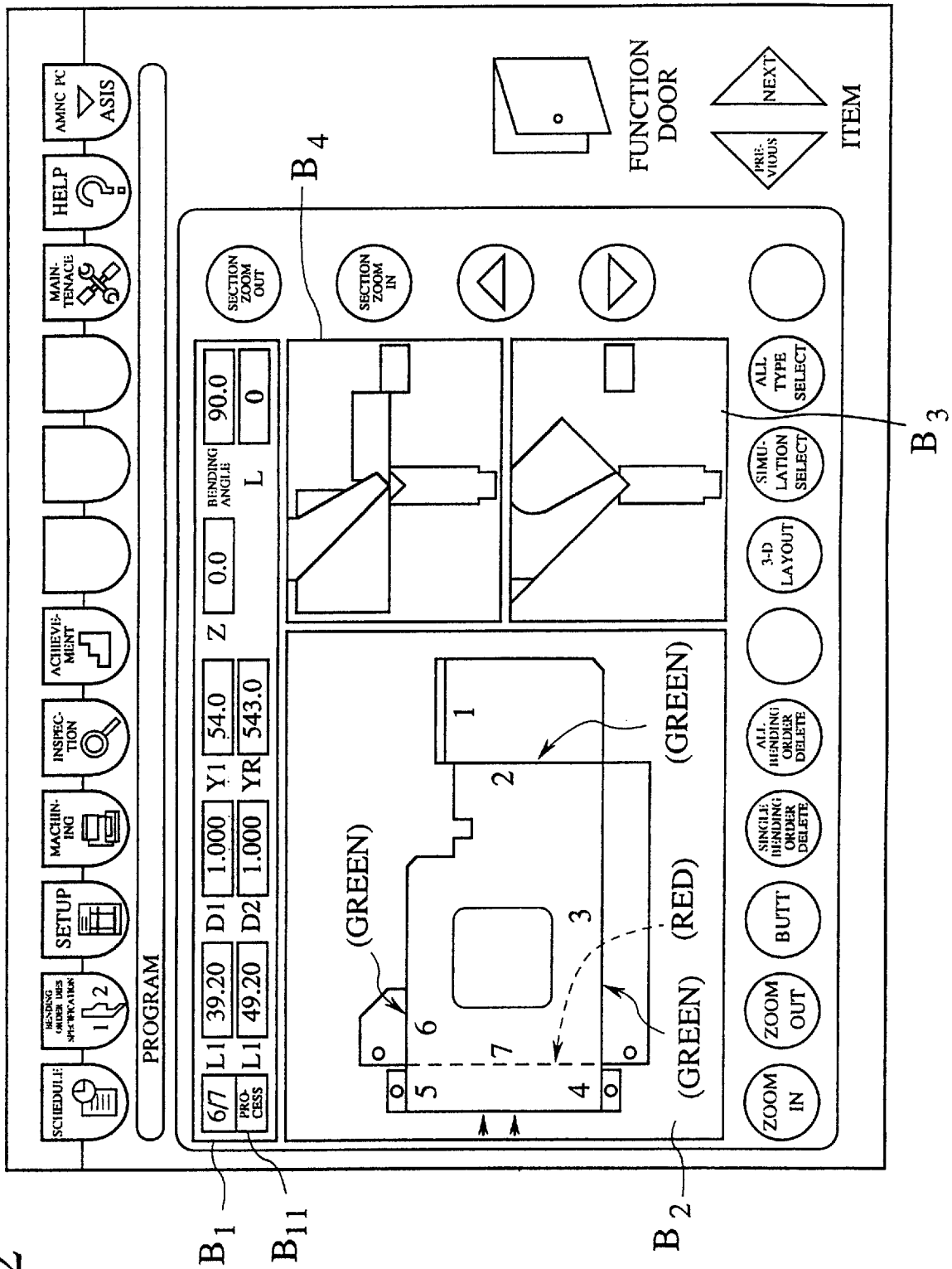
FIG. 12 is an explanatory view for the bending order screen.

This bending order instruction program displays a control parameter setting screen B1 of a specified product (NC program name), an exploded drawing screen B2, and simulation screens B3, B4, for example as shown in FIG. 12.

The information setting screen for bending order instruction shown in FIG. 12 shows the sixth step of seven steps. That is, the bending order instruction program first determines how many steps are required to complete bending of a product of a specified NC program, so that the bending information setting screens can be displayed in order from the initial step to the final step. Changing of the bending step can be performed by pressing the step B11 on the screen.

In the exploded view screen B12, as shown in FIG. 12, lines traced with the finger are indicated by green and numbers indicating an order of that trace are attached near the lines in green so as to indicate the order of bending.

Further, a next bending position is indicated in red line and a side to be butted against an indicator is indicated by two arrows. Further, the bending process simulation image B4 and after-bending simulation image B3 are displayed.

Figure 13:
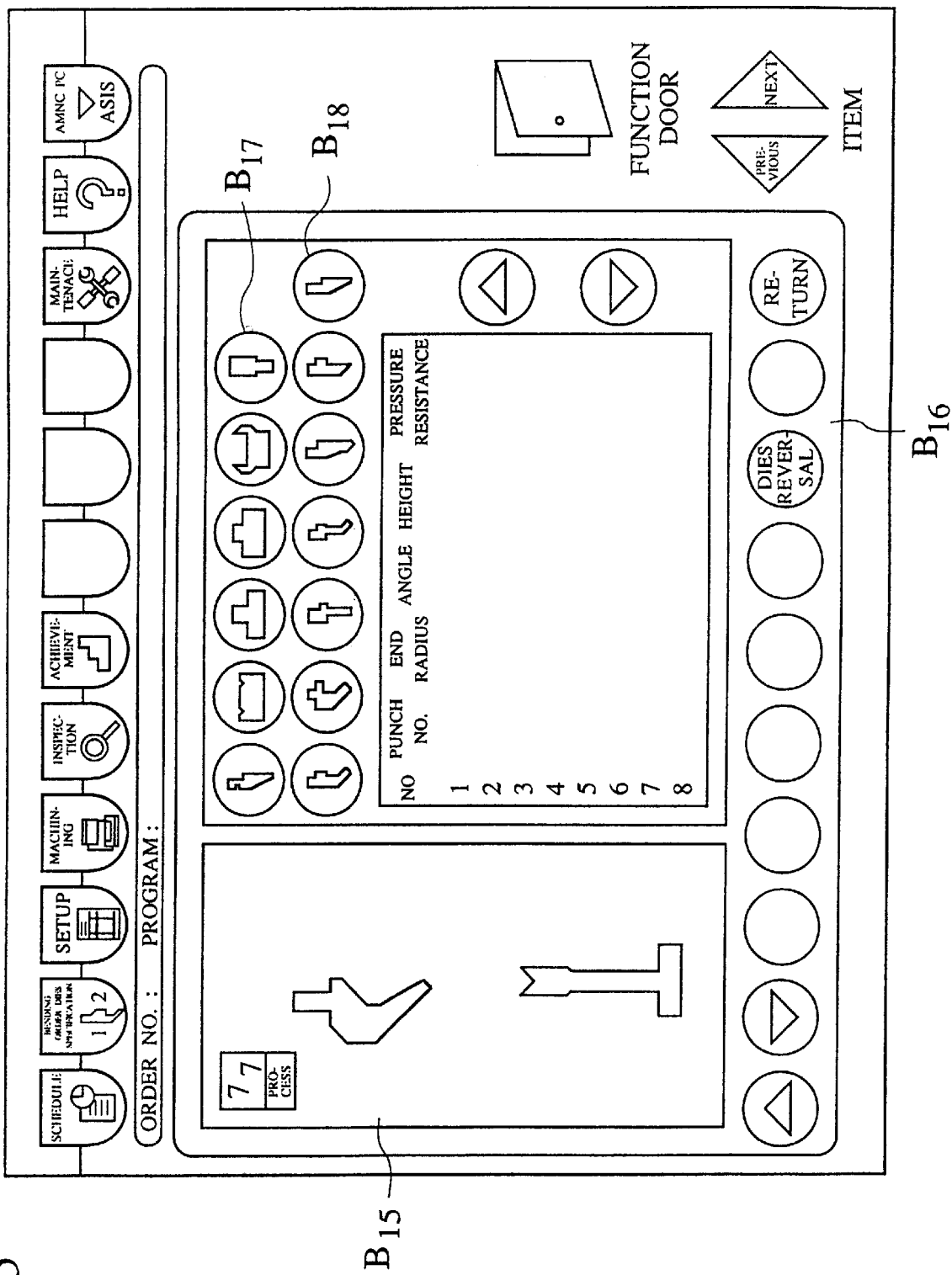
FIG. 13 is an explanatory view of the dies instruction screen.

Next, if the dies selection button is pressed on the screen shown in FIG. 12, the bending order/dies instruction program displays the information setting screen for dies selection shown in FIG. 13.

On the screen of FIG. 13, screen B15 containing a sectional view of a typical punch for bending a product and a sectional view of die, dies selection information screen B16, sectional view group B17 of dies similar to the sectional view of the die displayed on the left side of this screen, and sectional view group B18 of the punches are displayed. That is, dies type can be set for each bending.

Figure 14:
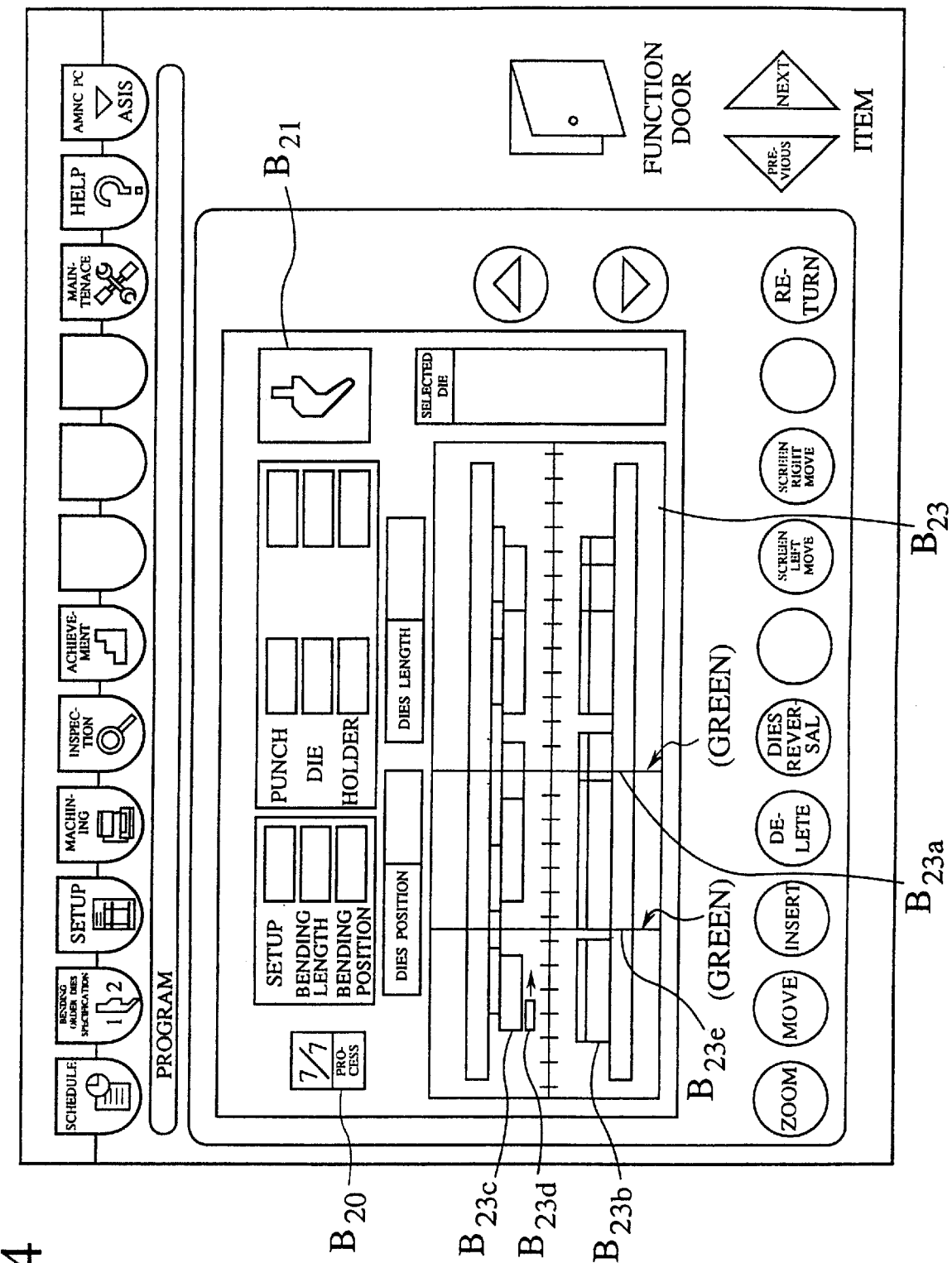
FIG. 14 is an explanatory view for the dies disposition screen.

When the dies information setting is completed in FIG. 13, the bending order/dies instruction program actuates dies disposition program and displays information setting screen for dies disposition shown in FIG. 14.

In FIG. 14, setup process B20 for dies disposition, a sectional view B21 of the dies selected on the screen of FIG. 13, dies information screen B22 about punch, holder, die and the like, dies disposition simulation screen B23 and the like are displayed.

In this dies disposition simulation screen B23, selected dies (punch, die) and workpiece can be disposed freely. Specifically, by swaying a vertical line B23a which represents machine center (0) to the right and left by touching with a finger to drag it, all the punches B23c and dies B23b are spontaneously moved in a similar manner in conformity with the movement of the vertical line B23a. Further, by touching a certain die, for example, with a finger, a vertical line B23d appears along the left edge of the certain die. Then by swaying a vertical line B23d to the right and left by touching with a finger to drag it, only the certain die is moved.

Furthermore, a workpiece B23e is also displayed on the screen. As shown in FIG. 14, in such a case that the length of a bending line and the length of the dies are different, the workpiece can be moved to any position by touching with a finger to drag it so that it may be bent by any part of the dies. In addition, according to the movement of the workpiece, inner data relating to a position of the corresponding back-gage are automatically changed.

Of course, dies and a workpiece can be also moved not by a finger but by a mouse device.

Figure 15:
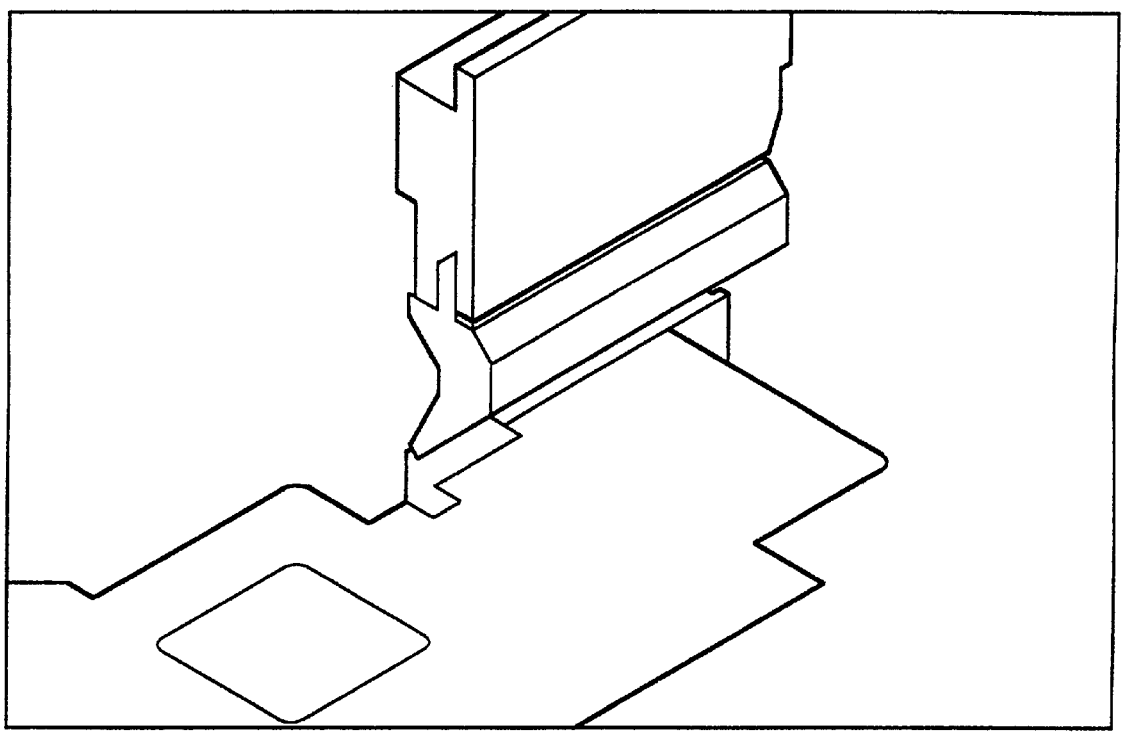
FIG. 15 is an explanatory view of the simulation screen.

If bending order, dies selection and dies disposition are terminated, the simulation screen shown in FIG. 15 can be displayed.

On the bending simulation screen shown in FIG. 15, continuous simulation of bending procedure and frame feeding can be carried out by a scroll button (not shown). Further, critical positions can be enlarged by an enlargement button (not shown). Further, it is possible to check for any interference from the rear side of a die by using rotation function.

Next, the setup procedure which is actuated when the setup icon is pressed will be described. When the setup icon is pressed, the icon corresponding program screen instruction portion 33 finds a program of information setting screen for the setup procedure indicated by program information pi corresponding to this icon and notifies the program administrator 25 of that program.

The program administrator 25 displays a program screen of the setup procedure stored in the main memory 27.

Figure 16:
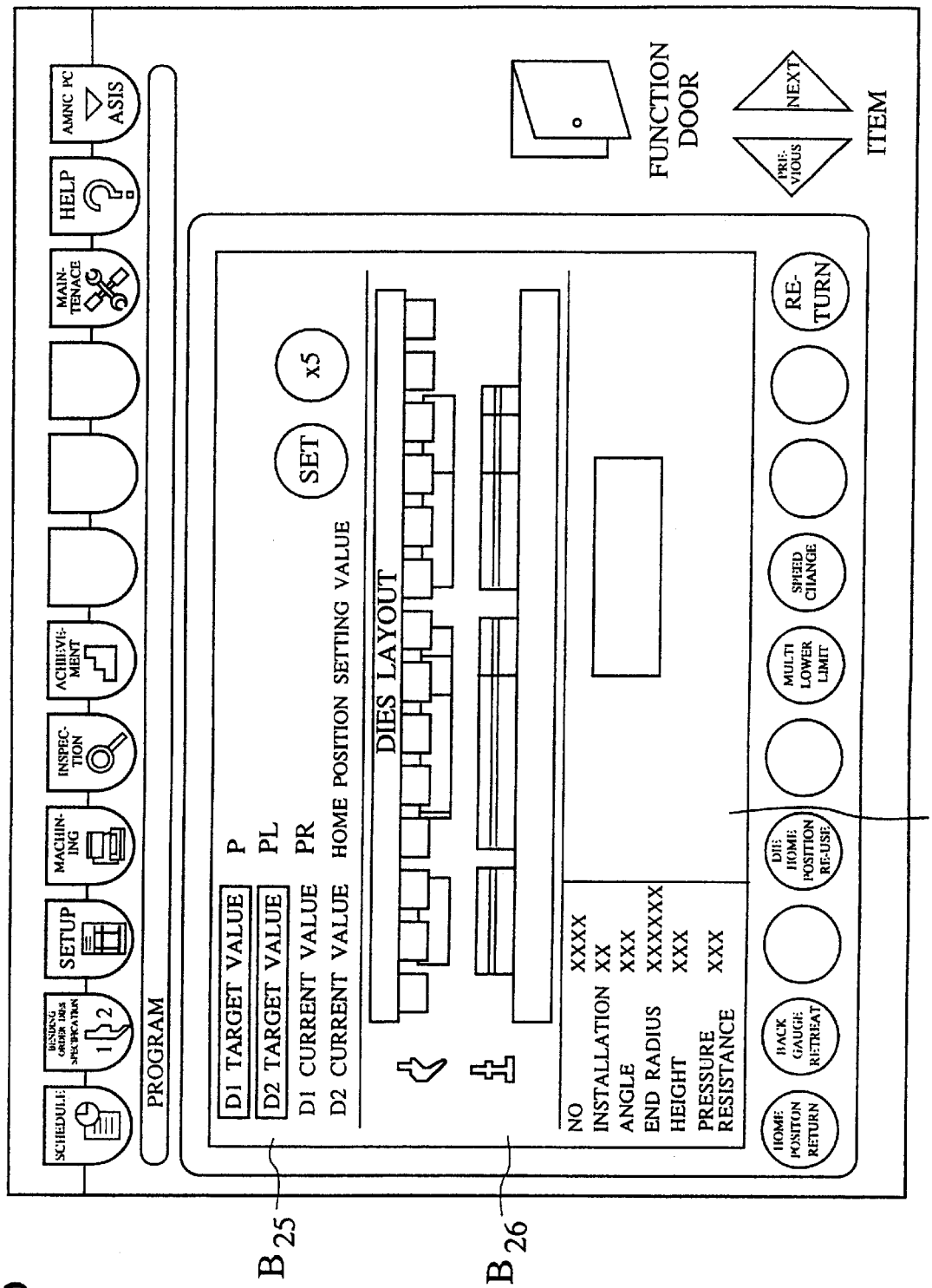
FIG. 16 is an explanatory view for the setup screen.

On this setup procedure information setting screen, as shown in FIG. 16, home position return setting screen B25 for executing home position return, dies layout screen B26 indicating the overall layout of the dies, dies detailed information screen B27 and the like are displayed. Then, when a punch or die on the dies layout screen B26 is touched, a sectional shape of that punch or die is displayed.

On the dies detailed information screen B27, information about punch No., angle, end radius and the like is displayed and on the right side, a screen for indicating a length of the pressed punch is displayed. Thus, by reading these information, it is possible to see where and what dies should be placed.

Next, the machining procedure which is actuated when the machining icon is pressed will be described. When the machining icon is pressed, the icon corresponding program screen instruction portion 33 shown in FIG. 2 finds a program of the information setting screen for machining procedure indicated by program information pi corresponding to this icon and notifies the program administrator 25 of that program.

The program administrator 25 displays a program screen of the machining procedure stored in the main memory 27.

Figure 17:
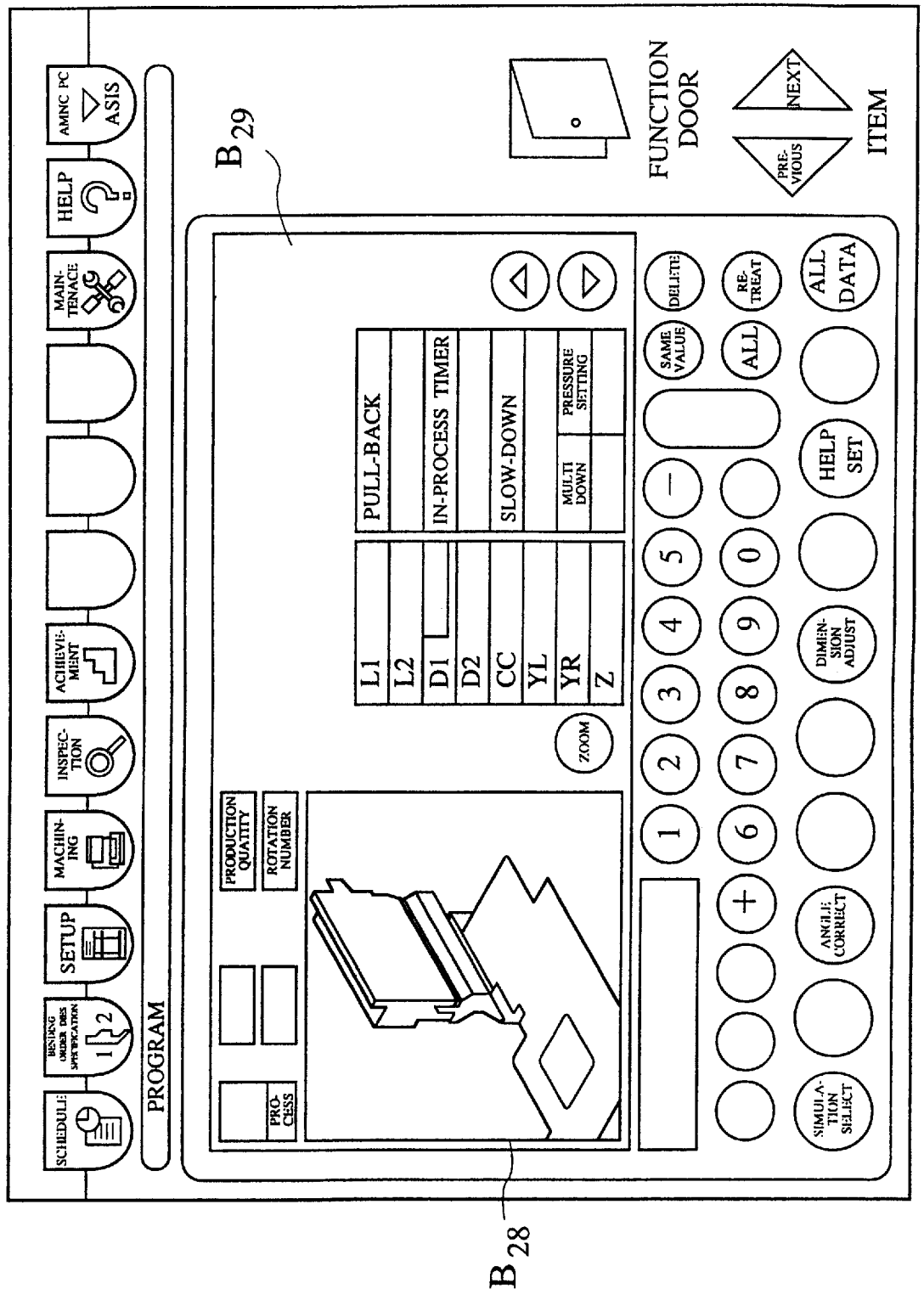
FIG. 17 is an explanatory view for the production trial bending screen.

On the information setting screen of this machining procedure, as shown in FIG. 17, bending simulation screen B28, bending data screen B29 of bending data necessary for the simulation on the bending simulation screen B28, and the like are displayed.

That is, the bending simulation screen B28 enables to simulate based on bending data and correct bending data by checking bending condition of that time. As for this bending data, L1 indicates right butting longitudinal position, L2 indicates left butting longitudinal position, D1 indicates right axis D value, D2 indicates left axis D value, CC indicates pressure ratio, YL indicates left butting lateral position, YR indicates right butting lateral position, and Z indicates butting vertical position.

Thus, for a new product, it is possible to search for an appropriate angle by a correcting dial while checking the simulation screen B28.

Next, inspection procedure which is actuated when the inspection icon is pressed will be described below. When the inspection icon is pressed, the icon corresponding program screen instruction portion 33 of FIG. 2 finds a program of the information setting screen for inspection procedure indicated by program information pi corresponding to this icon and notifies the program administrator 25 of that program.

The program administrator 25 displays a program screen of the inspection procedure stored in the main memory 27.

Figure 18:
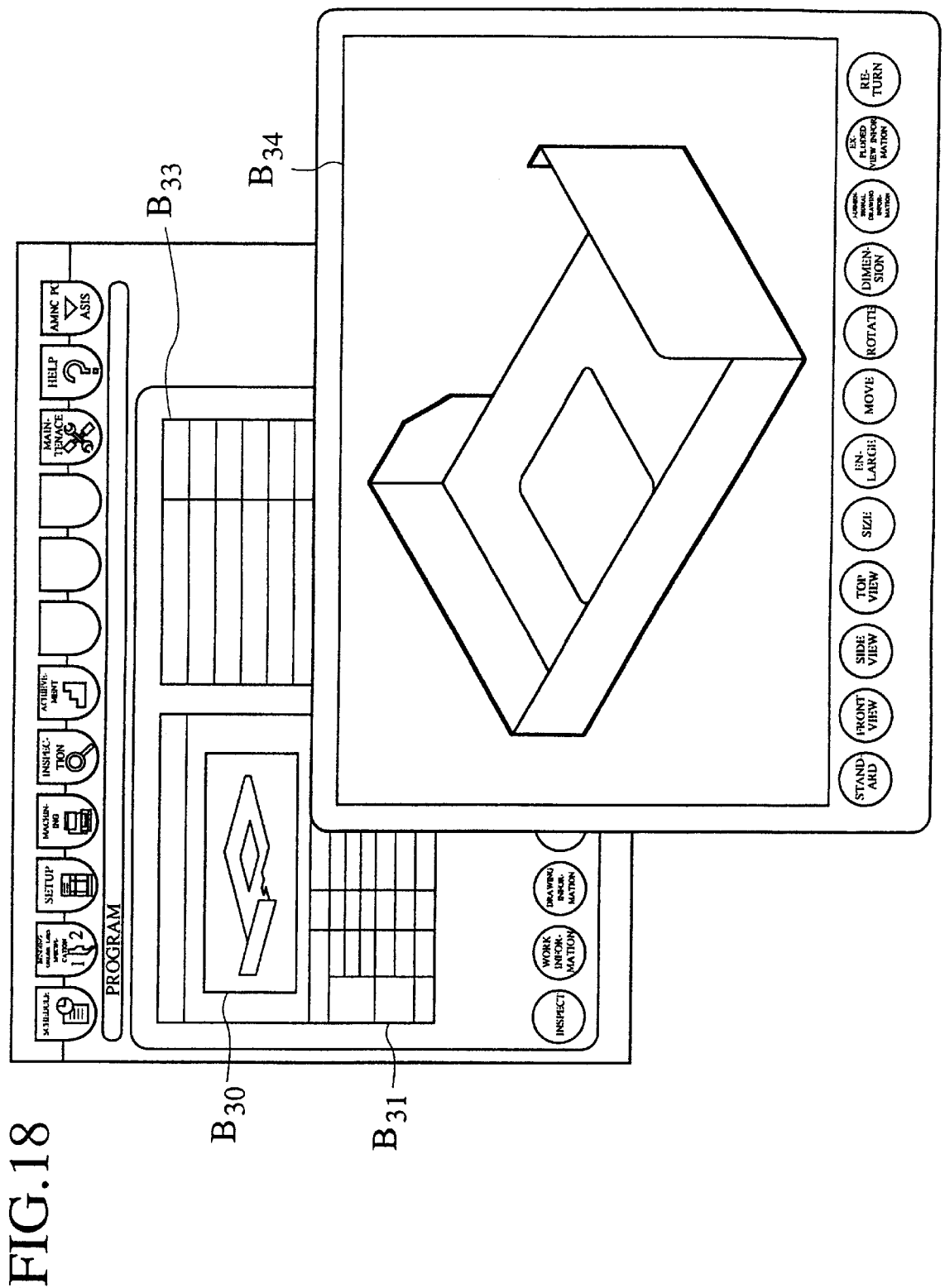
FIG. 18 is an explanatory view for the inspection screen.

The information setting screen for the inspection procedure, as shown in FIG. 18, contains 3-dimensional posture drawing screen B30 for inputting an inspection point, determination screen B31 for indicating a result of determination of an inspection value, inspection item result screen B33 and the like.

Further, screen B34 which is an enlargement of the 3-dimensional posture drawing screen B30 is displayed. This information setting screen includes a function for displaying a result of measurement of each point using network calipers.

Next, the achievement registration procedure which is actuated when the achievement icon is pressed or inspection procedure is terminated will be described below. When the achievement icon is pressed, the icon corresponding program screen instruction portion 33 shown in FIG. 2 finds a program of the information setting screen for achievement registration indicated by program information pi corresponding to this icon and notifies the program administrator 25 of that program.

The program administrator 25 displays the program screen for the achievement registration stored in the main memory 27.

Figure 19:
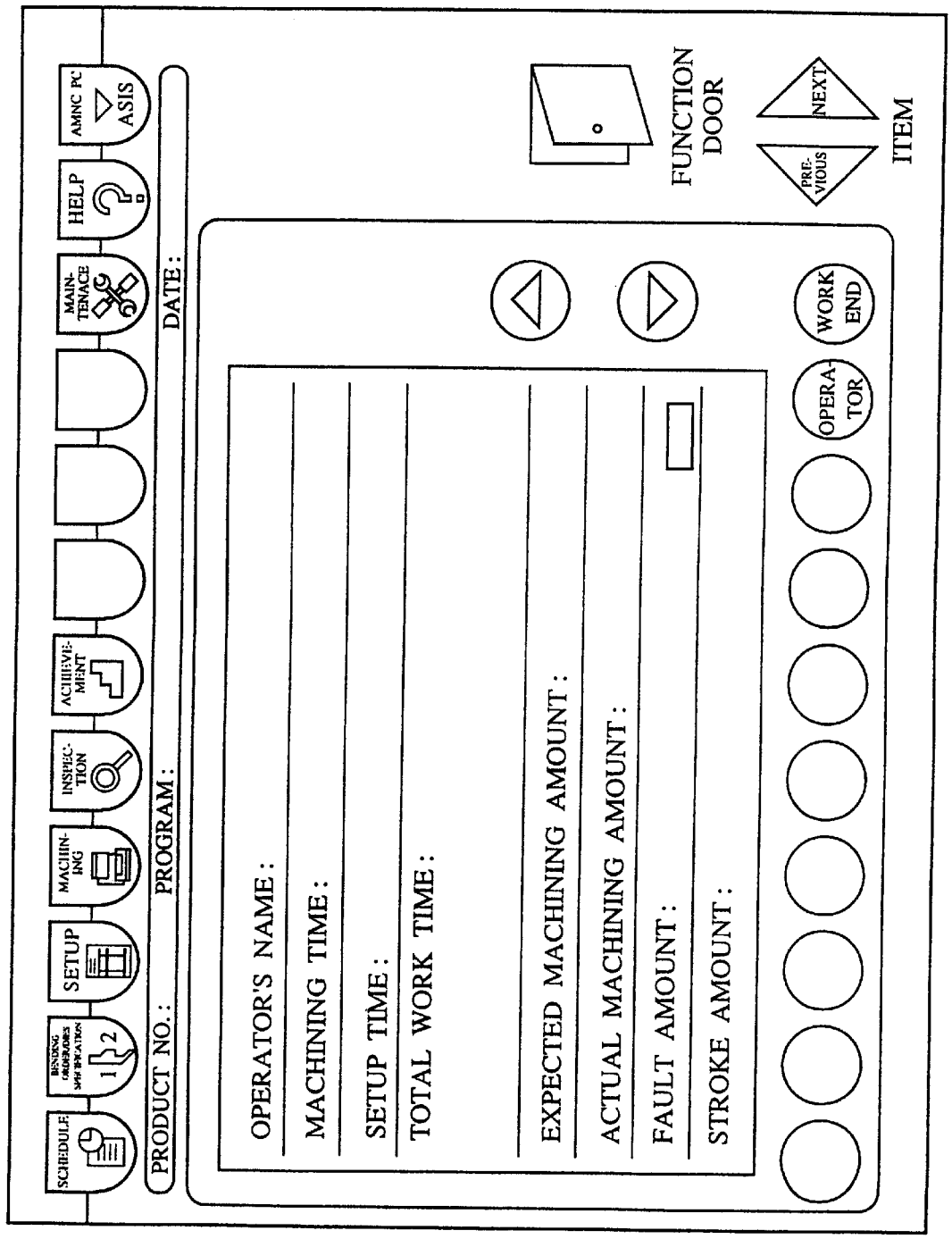
FIG. 19 is an explanatory view for the achievement screen.

As shown in FIG. 19, the achievement registration procedure screen indicates machining time, setup time, total working time, actual machining amount and the like.

That is, working time, machining time and the like of each screen for each step after a workpiece of a machining schedule is selected are accumulated and displayed, and the number of products made in actual machining is automatically counted. Then, these data are sent to the parent station and registered therein.

Example of Laser

An example in which the present invention is applied to NC apparatus for laser machine will be described. In this description, the machining condition icon will be mentioned. That is, a program described later is stored in the main memory with correspondence to the machining condition icon.

Figure 20:
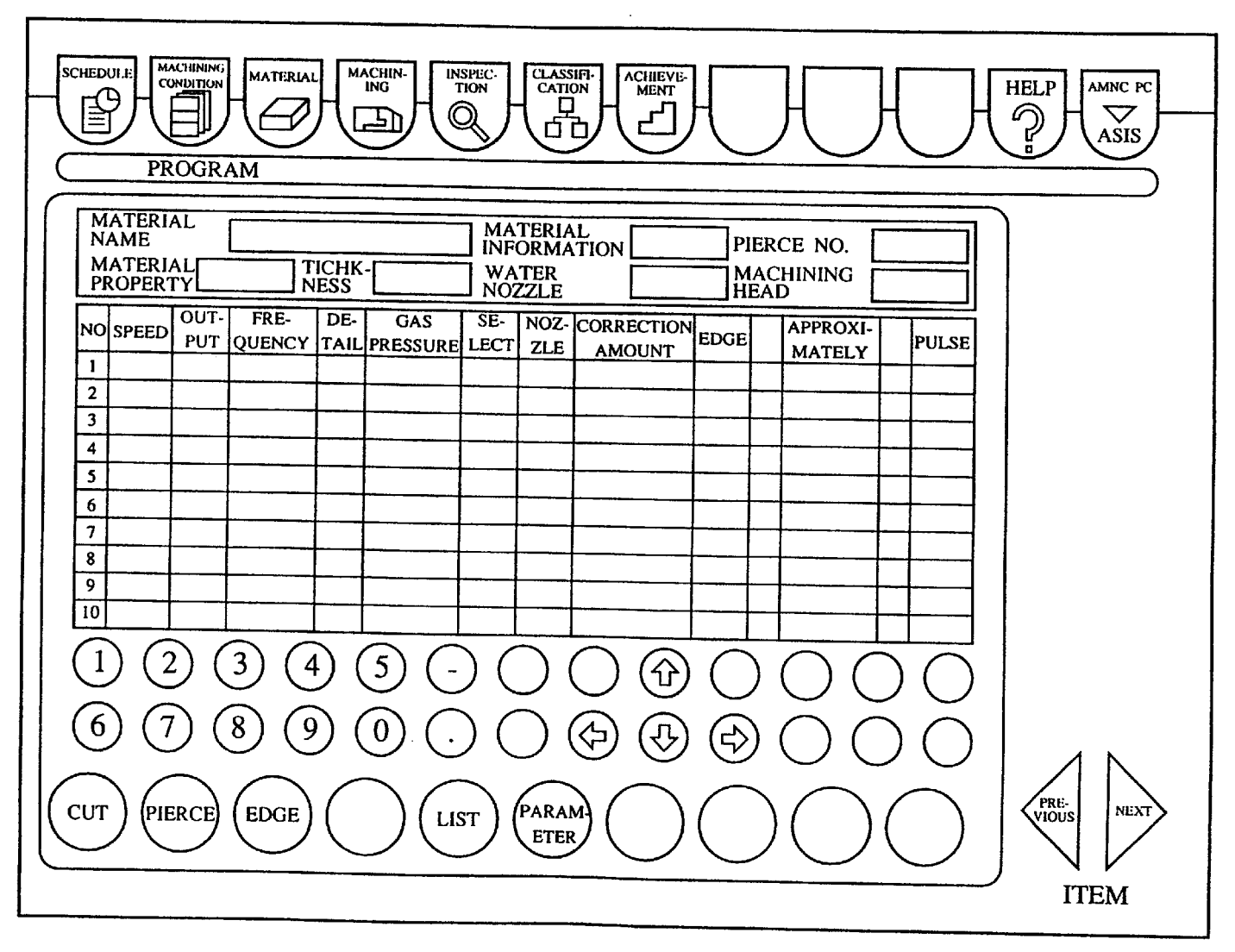

When the machining icon is pressed, the processing condition information program displays processing condition setting screen shown in FIG. 20. This screen displays material information setting screen for material name, material information, property and the like and laser information screen containing laser machining condition corresponding to E code, and the like.

Punching

An example in which the present invention is applied to the NC apparatus for punching machine will be described. In this description, the dies icon will be mentioned. That is, a program described later is stored in the main memory with correspondence to the dies icon.

Figure 21:
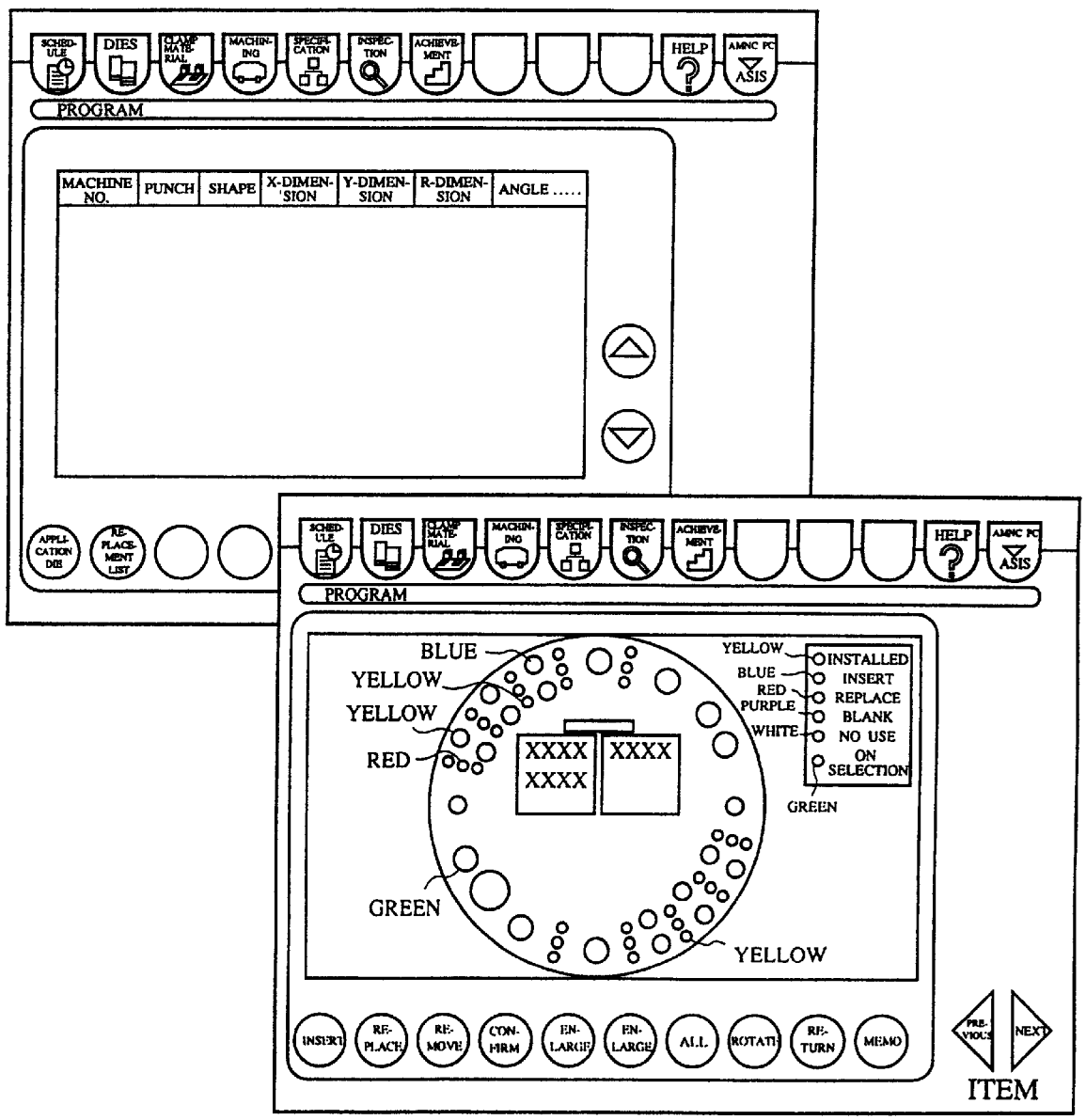
FIG. 21 is an explanatory view for a screen for punching press.

When the dies icon is pressed, the dies information program displays available dies list screen shown in FIG. 21. Further, a function for changing this screen to turret screen is also provided.

The turret screen of FIG. 21 indicates a mounted punch or die, inserted punch or die, replacement punch or die, a punch or die to be removed and currently used punch or die in each different color.

As described above, according to the present invention, the icon group in which the icons are arranged in the order of processing steps is displayed, and when any icon is selected, an information setting screen corresponding to this icon is displayed and receives an input.

Therefore, even inexperienced operator knows what to do next through a displayed screen easily and further can input and set almost all informations for each mode through that single screen of each step.

It should be understood that many modifications and adaptations of the invention will become apparent to those skilled in the art and it is intended to encompass such obvious modifications and changes in the scope of the claims appended hereto.

What is claimed is:

1. A display method for information setting screens along a process flow, the method comprising:

combining each icon parameter with at least one information setting screen program related to the icon parameter to store all icon parameters and information setting programs in a corresponding associative manner in a file;

displaying a plurality of icons corresponding to the icon parameters in an order of working processes of a machine tool, for information setting of each of the working processes in the machine tool;

reading and displaying at least one machining schedule in a memory upon system activation before any of the plurality of icons is selected by an operator;

when one of the plurality of icons displayed is selected by an operator, displaying at least one screen of the at least one information setting program combined with the selected icon while keeping all of the plurality of icons displayed.

2. A display method according to claim 1, the combining of each icon parameter comprising:

determining whether a product to be machined by the read machining schedule is a new product or a repeat product;

when the product is a new product, reading combination conditions corresponding to the icon parameters stored in a file and combining each icon parameter with the at least one information setting screen program related to said icon parameter based on a combination conditions corresponding the icon parameter to store all the icon parameters and the information setting programs in the corresponding manner in the file; and when the product is a repeat product, retrieving at least one information setting screen program corresponding to the product from the file in which information setting screen programs for products which have been previously machined are stored.

3. A display method according to claim 1, wherein upon system activation, a schedule icon, which is at the head of the plurality of icons is automatically selected, and the machining schedule and CAD data corresponding to the machining schedule in a form of 3-dimensional drawings are displayed.

4. A display method according to claim 1, wherein when a bending order instruction icon is selected, a screen for the instruction bending order is displayed.

5. A display method according to claim 4, wherein when lines of an exploded drawing to be bent are traced with a contact member in an order of bending, a display color of the traced lines is changed to a predetermined color.

6. A display method according to claim 5, wherein numbers of bending order are displayed near the traced lines.

7. A display method according to claim 1, wherein when a dies instruction icon is selected, a screen for determining dies for each bending process is displayed.

8. A display method according to claim 7, wherein when dies for each bending process are determined, a screen for determining disposition of the dies is displayed.

9. A display method according to claim 8, wherein dies selected for each bending process are displayed on the screen for determining disposition of the dies, and when a vertical line which represents machine center is dragged horizontally on the screen, all the dies including punches are moved in conformity with a movement of the vertical line.

10. A display method according to claim 8, wherein dies selected for each bending process are displayed on the screen for determining disposition of the dies, and when a die and a corresponding punch are specified as target die and punch, so as to display a vertical line on the specified die and punch, and the vertical line is dragged horizontally on the screen, the specified die and punch are moved in conformity with a movement of the vertical line.

11. A display method according to claim 1, wherein the selected icon is made to light up to indicate an active state.

12. A multi-window type NC apparatus wherein a plurality of screens are opened on a display portion at a same time and the display portion is overlaid with a touch panel, the NC apparatus comprising:

a memory for storing at least one machining schedule;

an icon corresponding program combination portion for combining each icon parameter with at least one information setting screen program related to the icon parameter to store all icon parameters and information setting programs in a corresponding manner in a file;

a process flow icon indication instruction portion for displaying a plurality of icons corresponding to the icon parameters in an order of working processes of a machine tool, for information setting for each of the working processes of the machine tool; and an icon corresponding program screen indication instruction portion for, when one of the plurality of icons displayed is selected, displaying at least one screen for the at least one information setting program combined with the selected icon while keeping all of the plurality of icons displayed.

13. A multi-window type NC apparatus according to claim 12, the icon corresponding program combination portion comprising:

a new/repeat determining portion for determining whether a product to be machined by the read machining schedule is a new on or a repeat one;

a combining portion for, when the product is a new product, reading combination conditions corresponding icon parameters stored in a file and combining each icon parameter with the at least one information setting screen program related to the icon parameter based on a combination condition corresponding the icon parameter to store all the icon parameters and the information setting programs in the corresponding manner in said file; and a retrieving portion for, when the product is a repeat product, retrieving at least one information setting screen program corresponding to the product from said file in which information setting screen programs for products which have been previously machined are stored.

14. A multi-window type NC apparatus according to claim 12, wherein upon system activation, the icon corresponding program screen indication instruction portion initially displays a machining schedule and CAD data corresponding to the machining schedule in the form of a three-dimensional drawing, corresponding to a schedule icon which is at the head of the plurality of icons.

* * * * *

UNITED STATES PATENT AND TRADEMARK OFFICE
CERTIFICATE OF CORRECTION

PATENT NO. : 6,236,399 B1
DATED : May 22, 2001
INVENTOR(S) : K. Nishiyama et al.

It is certified that error appears in the above-identified patent and that said Letters Patent is hereby corrected as shown below:

<u>Column 13,</u>
Lines 60-61, "combination conditions" should be -- combination of conditions --.
Lines 64-65, "combination conditions corresponding the icon"
should be -- combination of conditions corresponding to the icon --.

<u>Column 14,</u>
Line 67, "on" should be -- one --.

<u>Column 15,</u>
Lines 2-3, "combination conditions corresponding icon parameters" should be -- a combination of conditions corresponding to the icon parameters --.
Line 6, "combination condition corresponding the icon" should be -- combination of conditions corresponding to the icon --.

Signed and Sealed this

Twenty-first Day of May, 2002

Attest:

JAMES E. ROGAN
*Director of the United States Patent and Trademark Office*

*Attesting Officer*